United States Patent
Nakazato

(10) Patent No.: US 9,753,607 B2
(45) Date of Patent: Sep. 5, 2017

(54) ELECTRONIC DEVICE, CONTROL METHOD, AND CONTROL PROGRAM

(71) Applicant: KYOCERA CORPORATION, Kyoto-shi, Kyoto (JP)

(72) Inventor: Kouji Nakazato, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 281 days.

(21) Appl. No.: 14/411,468

(22) PCT Filed: May 31, 2013

(86) PCT No.: PCT/JP2013/065164
§ 371 (c)(1),
(2) Date: Dec. 26, 2014

(87) PCT Pub. No.: WO2014/002683
PCT Pub. Date: Jan. 3, 2014

(65) Prior Publication Data
US 2015/0199110 A1    Jul. 16, 2015

(30) Foreign Application Priority Data

Jun. 28, 2012 (JP) ................................. 2012-145403

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 1/1694* (2013.01); *G06F 3/03* (2013.01);
(Continued)

(58) Field of Classification Search
CPC ..................................................... G06F 3/0487
(Continued)

(56) References Cited

U.S. PATENT DOCUMENTS 8,375,334 B2 * 2/2013 Nakano ................. G06F 1/1626
715/810
8,532,675 B1 * 9/2013 Pasquero .......... H04M 1/72572
345/158

(Continued)

FOREIGN PATENT DOCUMENTS

| JP | 2009-181501 A | 8/2009 |
| WO | 2008/086302 A1 | 7/2008 |

OTHER PUBLICATIONS

International Search Report for PCT/JP2013/065164 mailed Aug. 20, 2013.

*Primary Examiner* — William Titcomb
(74) *Attorney, Agent, or Firm* — Hauptman Ham, LLP

(57) ABSTRACT

According to one of aspects, an electronic device includes: a display configured to display a plurality of icons each corresponding to an application; a detecting unit configured to detect an attitude of the electronic device; and a controller configured to cause the display to display a first screen where the icons are arranged in a first pattern when a first attitude is detected by the detecting unit, and cause the display to display a second screen where the icons are arranged in a second pattern when a second attitude is detected by the detecting unit.

8 Claims, 31 Drawing Sheets

(51) Int. Cl.
  *G06F 3/0487*  (2013.01)
  *G06F 1/16*  (2006.01)
  *G06F 3/0482*  (2013.01)
  *G06F 3/03*  (2006.01)
  *G06F 3/041*  (2006.01)
  *G06F 3/0484*  (2013.01)
  *G06F 3/0488*  (2013.01)
  *H04M 1/725*  (2006.01)

(52) U.S. Cl.
  CPC ............ *G06F 3/041* (2013.01); *G06F 3/0482* (2013.01); *G06F 3/0484* (2013.01); *G06F 3/0487* (2013.01); *G06F 3/0488* (2013.01); *H04M 1/72586* (2013.01); *H04M 2250/12* (2013.01); *H04M 2250/22* (2013.01)

(58) Field of Classification Search
  USPC ......................................................... 715/763
  See application file for complete search history.

(56) References Cited

U.S. PATENT DOCUMENTS

2004/0100479 A1* 5/2004 Nakano ................. G06F 1/1626
                                                        715/700
2009/0199134 A1  8/2009 Murayama
2010/0088639 A1  4/2010 Yach et al.
2012/0284620 A1  11/2012 Yach et al.

* cited by examiner

FIG.19

| ACTUAL USAGE | | |
|---|---|---|
| | Number of Executions | Cumulative Number of Executions |
| Phone Call Application | 23 | 312 |
| Mail Application | 46 | 1024 |
| Browser Application | 33 | 787 |
| Navigate Application | 15 | 124 |
| Music Player Application | 17 | 468 |
| Calendar Application | 1 | 9 |
| Camera Application | 15 | 336 |
| ⋮ | ⋮ | ⋮ |

FIG.28

| ACTUAL USAGE | | | | |
|---|---|---|---|---|
| | Number of Executions | Cumulative Number of Executions | Attitude Upon Execution | |
| | | | Vertical | Horizontal |
| Phone Call Application | 23 | 312 | 312 | 0 |
| Mail Application | 46 | 1024 | 1024 | 0 |
| Browser Application | 33 | 787 | 687 | 100 |
| Navigate Application | 15 | 124 | 74 | 50 |
| Music Player Application | 17 | 468 | 468 | 0 |
| Calendar Application | 1 | 9 | 9 | 0 |
| Camera Application | 15 | 336 | 0 | 336 |
| ⋮ | ⋮ | ⋮ | ⋮ | |

ELECTRONIC DEVICE, CONTROL METHOD, AND CONTROL PROGRAM

CROSS-REFERENCE TO RELATED APPLICATION

The present application is a National Phase of International Application Number PCT/JP2013/065164 filed on May 31, 2013, and claims the benefit of priority from Japanese Patent Application No. 2012-145403 filed on Jun. 28, 2012.

FIELD

The present application relates to an electronic device, a control method, and a control program.

BACKGROUND

A touch screen device having a touch screen is known as a mobile electronic device used by a user.

Examples of the touch screen device include, but are not limited to, a smartphone and a tablet. The touch screen device detects a gesture of a finger, a pen, or a stylus pen through the touch screen. Then the touch screen device operates according to the detected gesture. An example of the operation according to the detected gesture is described in, for example, Patent Literature 1.

The basic operation of the touch screen device is implemented by an OS (Operating System) installed into the device. Examples of the OS include, but are not limited to, Android, BlackBerry OS, iOS, Symbian OS, and Windows Phone.

Furthermore, a function of displaying a list of icons corresponding to applications is installed into some of the touch screen devices so that the user can handle an installed application with a simple operation. Such a function includes an edit function by which the user can freely customize the types, the number, or the like of icons to be displayed on a home screen.

CITATION LIST

Patent Literature

Patent Literature 1: International Publication No. WO 2008/086302

Technical Problem

Incidentally, some of the touch screen devices has a function of rotating and displaying a screen displayed on a display so as to match a top-to-bottom direction of the screen with that of the device when, for example, an attitude (orientation) of the device is changed from the vertical to the horizontal. However, when the screen is rotated, there are some cases where user's convenience is not always considered in terms of a positional relation of a plurality of icons displayed in a list on the screen.

For the foregoing reasons, there is a need for an electronic device, a control method, and a control program capable of improving the user's convenience.

SUMMARY

According to one of aspects, An electronic device includes: a display configured to display a screen where a plurality of icons each corresponding to an application are arranged; a detecting unit configured to detect an attitude of the electronic device; and a controller configured to cause the display to display a screen where the icons are arranged in a first pattern when a first attitude is detected by the detecting unit, and cause the display to display a screen where the icons are arranged in a second pattern when a second attitude is detected by the detecting unit.

According to one of aspects, a control method is executed by an electronic device including a display configured to display a screen where a plurality of icons each corresponding to an application are arranged. The method includes: detecting an attitude of the electronic device; and displaying a screen where the icons are arranged in a first pattern on the display when a first attitude is detected, and displaying a screen where the icons are arranged in a second pattern on the display when a second attitude is detected.

According to one of aspects, a control program causes an electronic device including a display configured to display a screen where a plurality of icons each corresponding to an application are arranged to execute: detecting an attitude of the electronic device; and displaying a screen where the icons are arranged in a first pattern on the display when a first attitude is detected, and displaying a screen where the icons are arranged in a second pattern on the display when a second attitude is detected.

BRIEF DESCRIPTION OF DRAWINGS

FIG. 19 is a diagram of an example of actual usage of applications stored in a storage according to Embodiment 2.

FIG. 28 is a diagram of an example of actual usage of applications stored in the storage according to Embodiment 3.

DESCRIPTION OF EMBODIMENTS

Embodiments for enabling implementation of an electronic device, a control method, and a control program according to the present application will now be explained in detail with reference to some drawings. Descriptions below are not intended to limit the scope of the electronic device, the control method, and the control programs according to the present application in any way. The elements disclosed in the following descriptions include those that can be easily conceived by those skilled in the art, those that are substantially the same, and those within what is called a scope of equivalents. In the description below, a smartphone with a touch screen is used as an example of the electronic device including a touch screen.

Embodiment 1

Figure 1:
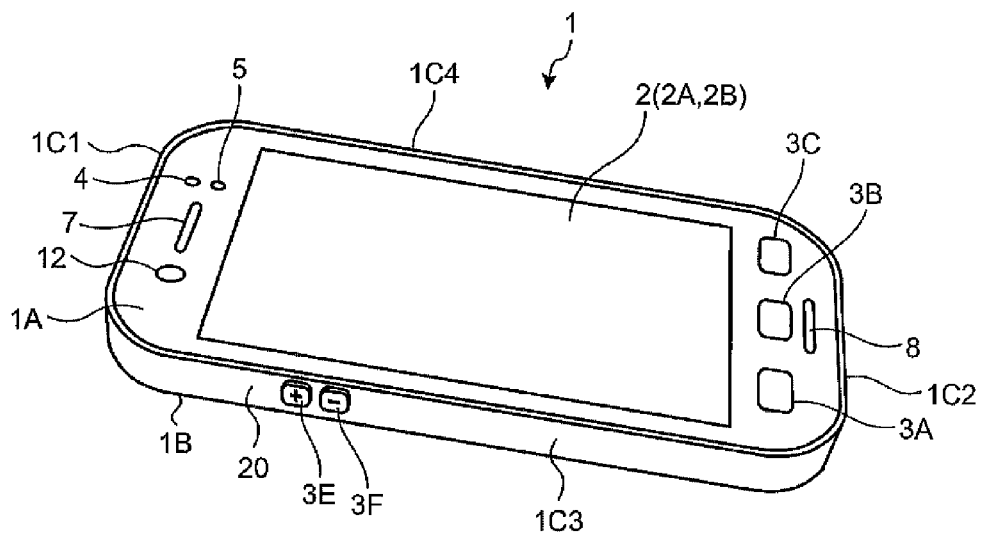
FIG. 1 is a perspective view of a smartphone according to embodiments.
Figure 2:
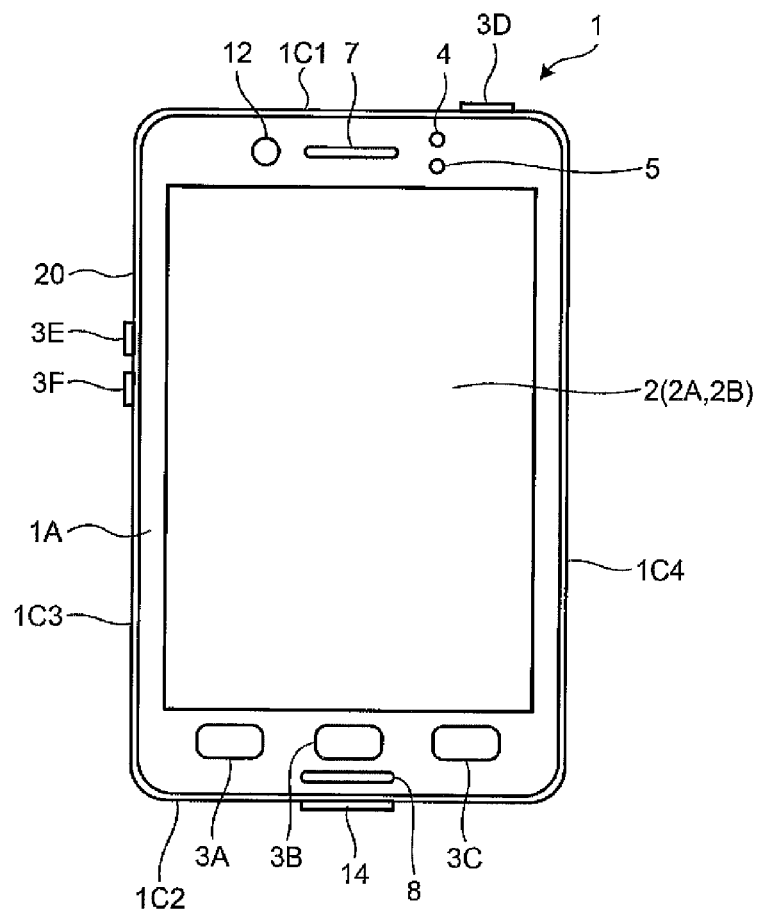
FIG. 2 is a front view of the smartphone.
Figure 3:
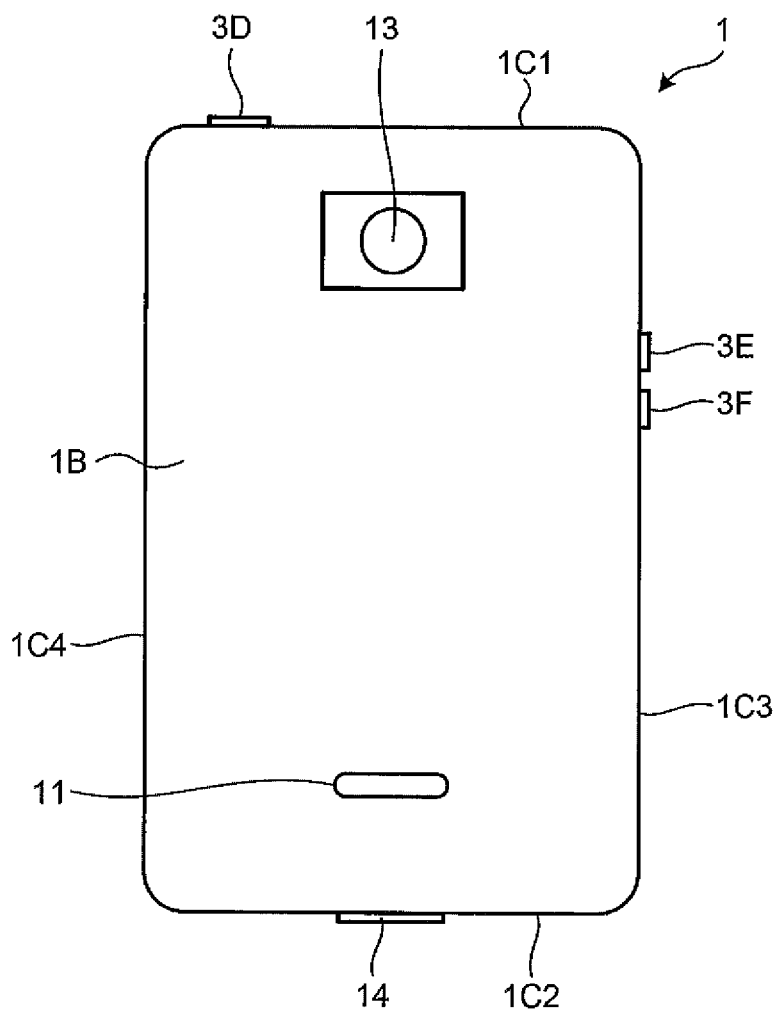
FIG. 3 is a rear view of the smartphone.

The overall configuration of this smartphone 1 according to Embodiment 1 will now be explained with reference to FIGS. 1 to 3. FIG. 1 is a perspective view of the smartphone according to embodiments. FIG. 2 is a front view of the smartphone. FIG. 3 is a rear view of the smartphone. As illustrated in FIGS. 1 to 3, the smartphone 1 has a housing 20. The housing 20 has a front face 1A, a back face 1B, and side faces 1C1 to 1C4. The front face 1A is a front surface of the housing 20. The back face 1B is a rear surface of the housing 20. The side faces 1C1 to 1C4 are side surfaces that connect the front face 1A to the back face 1B. Hereinafter, the side faces 1C1 to 1C4 may be generally referred to as a side face 1C, without specifying which one of the side surfaces the side face 1C is.

The smartphone 1 includes a touch screen display 2, buttons 3A to 3C, an illumination sensor 4, a proximity sensor 5, a receiver 7, a microphone 8, and a camera 12 that are positioned on the front face 1A. The smartphone 1 includes a speaker 11 and a camera 13 positioned on the back face 1B. The smartphone 1 also includes buttons 3D to 3F and a connector 14 on the side faces 1C. Hereinafter, the buttons 3A to 3F may be generally referred to as a button 3, without specifying which one of the buttons 3A to 3F the button 3 is.

The touch screen display 2 includes a display 2A and a touch screen 2B. In an example illustrated in FIG. 1, the display 2A and the touch screen 2B both have an approximate rectangular shape, but the shapes of the display 2A and the touch screen 2B are not limited thereto. The display 2A and the touch screen 2B may be any shape, including a square or a circle. In an example illustrated in FIG. 1, the display 2A and the touch screen 2B are laid on top of each other, but the arrangement of the display 2A and the touch screen 2B is not limited thereto. The display 2A and the touch screen 2B may be arranged side by side, or separated from each other, for example. In an example illustrated in FIG. 1, the long sides of the display 2A extend along the long sides of the touch screen 2B, and the short sides of the display 2A extend along the short sides of the touch screen 2B, but how the display 2A and the touch screen 2B are laid on top of each other is not limited thereto. In a configuration in which the display 2A and the touch screen 2B are laid on top of each other, one or more sides of the display 2A may not extend along any side of the touch screen 2B, for example.

The display 2A is provided with a display device such as a liquid crystal display (LCD), an organic electro-luminescence display (GELD), or an inorganic electro-luminescence display (IELD). The display 2A displays characters, images, symbols, figures, and the like.

The touch screen 2B detects contact of a finger, a pen, a stylus pen, or the like with the touch screen 2B. The touch screen 2B is capable of detecting the positions of the contact of a plurality of fingers, pens, stylus pens, or the like with the touch screen 2B. In the description hereunder, a finger, a pen, a stylus pen, or the like that contacts with the touch screen 2B may be referred to as a "contacting object".

Any technology such as capacitive sensing, resistive sensing, surface acoustic wave (SAW) (or ultrasonic) sensing, infrared sensing, electromagnetic induction sensing, and load sensing, may be used to allow the touch screen 2B to detect contact. To simplify the explanation, in the described below, the explanation is made supposing that the user operates the smartphone 1 by touching the touch screen 2B with a finger.

The smartphone 1 determines the type of a gesture based on at least one of contact detected by the touch screen 2B, the position at which the contact is detected, a change in the position at which the contact is detected, the interval at which the contacts are detected, and the number of times that the contacts are detected. A gesture is an operation performed on the touch screen 2B. Examples of the gesture the type of which is determined by the smartphone 1 include, but are not limited to, a touch, a long touch, a release, a swipe, a tap, a double-tap, a long tap, a drag, a flick, a pinch-in, and a pinch-out.

A "touch" is a gesture of touching the touch screen 2B with a finger. The smartphone 1 determines a gesture of touching the touch screen 2B with a finger as a touch. A "long touch" is a gesture of touching the touch screen 2B with a finger for a longer time than a predetermined time. The smartphone 1 determines a gesture of touching the touch screen 2B with a finger for a longer time than the predetermined time as a long touch.

A "release" is a gesture of removing a finger from the touch screen 2B. The smartphone 1 determines a gesture of removing a finger from the touch screen 2B as a release. A "swipe" is a gesture of moving a finger across the touch screen 2B while keeping the finger in contact with the touch screen 2B. The smartphone 1 determines a gesture of moving a finger across the touch screen 2B while keeping the finger in contact with the touch screen 2B as a swipe.

A "tap" is a gesture of performing a release subsequent to a touch. The smartphone 1 determines a gesture of performing a release subsequent to a touch as a tap. A "double-tap" is a gesture of making a touch-and-release twice. The smartphone 1 determines a gesture of making a touch-and-release twice as a double-tap.

A "long tap" is a gesture of performing a release subsequent to a long touch. The smartphone 1 determines a gesture performing of a release subsequent to a long touch as a long tap. A "drag" is a gesture of a swipe started from an area where a movable object is displayed. The smartphone 1 determines a gesture of a swipe started from a region where a movable object is displayed as a drag.

A "flick" is a gesture of touching the touch screen 2B and sliding the finger away from the touch screen 2B. In other words, a "flick" is a gesture of releasing a moving finger after a touch. The smartphone 1 determines a gesture of touching the touch screen 2B and releasing a moving finger away from the touch screen 2B as a flick. A flick is often performed while the finger is moved in one direction. Examples of a flick include a "flick-up" in which the finger is moved upwardly in the screen, a "flick-down" in which the finger is moved downwardly in the screen, a "flick-to-right" in which the finger is moved to the right in the screen, and a "flick-to-left" in which the finger is moved to the left in the screen. In a flick, a finger is often moved quicker than in a swipe.

A "pinch-in" is a gesture of swiping a plurality of fingers in directions approaching to one another. The smartphone 1 determines a gesture of moving fingers in directions reducing the distance between the positions of one finger and the other finger(s) detected by the touch screen 2B as a pinch-in. A "pinch-out" is a gesture of swiping a plurality of fingers in directions away from to one another. The smartphone 1 determines a gesture of moving fingers in directions extending the distance between the positions of one finger and the other finger(s) detected by the touch screen 2B as a pinch-out.

In the embodiments, a gesture performed with one finger may be referred to as a "single touch gesture". In the embodiments, a gesture made with two or more fingers may be referred to as a "multi-touch gesture". A pinch-in and a pinch-out correspond to a multi-touch gesture. A tap, a flick, and a swipe, for example, correspond to a single touch gesture, if such a gesture is made with one finger, and correspond to a multi-touch gesture if two or more fingers are used.

The smartphone 1 operates in accordance with a gesture the type of which includes those described above, and is determined via the touch screen 2B, so that intuitive and easy-to-use operability for users can be achieved. The smartphone 1 may perform different operations in accordance with the determined type of a gesture, depending on the screen displayed on the display 2A. Hereinafter, the operation of the touch screen 2B detecting a gesture and the smartphone 1 determining the type of the gesture as "X" is sometimes simply described as an operation of "the smartphone 1 detecting X", or of "the controller detecting X", in order to simplify the description.

Figure 4:
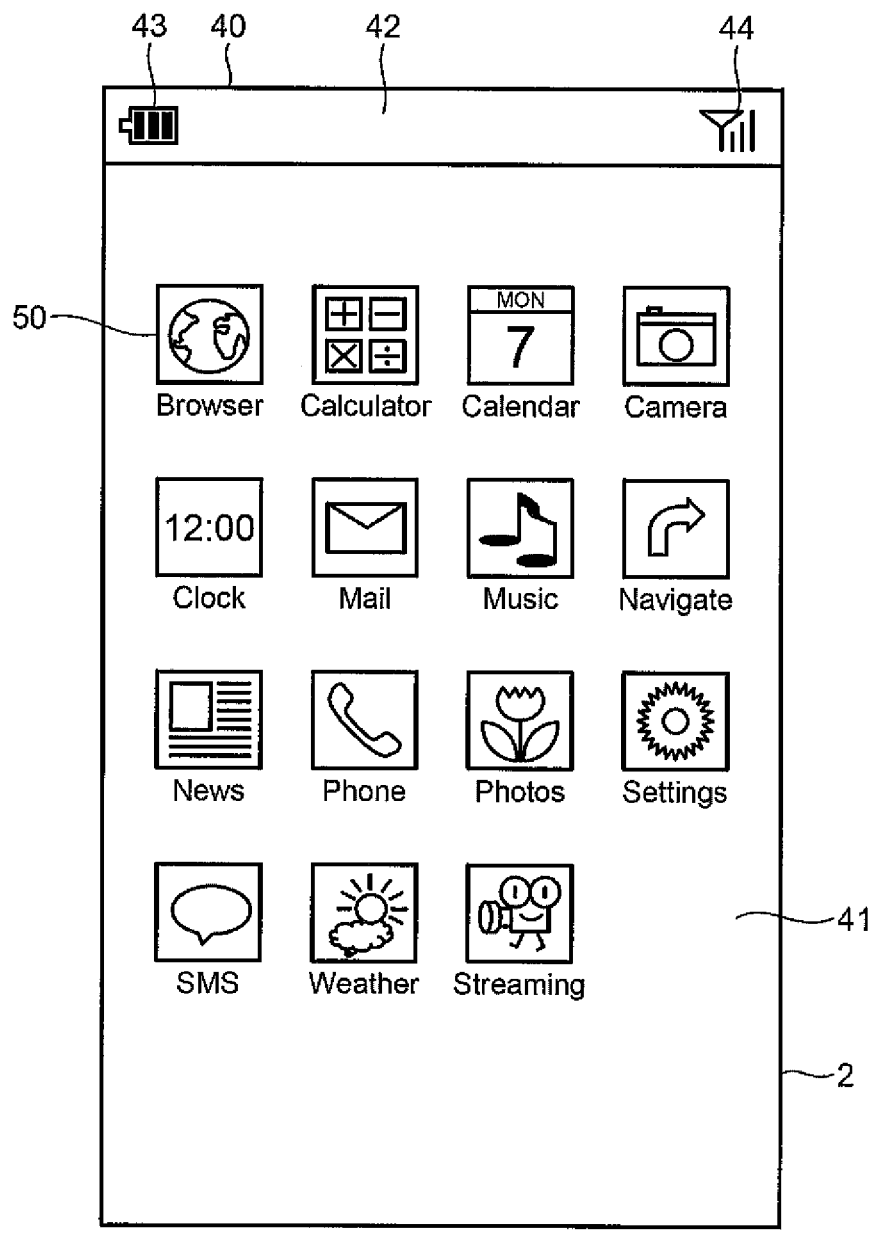
FIG. 4 is a diagram of an example of a screen displayed on a display.

An example of a screen displayed on the display 2A will now be explained with reference to FIG. 4. FIG. 4 is a diagram of an example of a screen displayed on a display. The screen 40 illustrated in FIG. 4 is also referred to as a home screen, a launcher screen, a desktop, a standby screen, an idle screen, or a standard screen. The screen 40 illustrated in FIG. 4 is displayed on the display 2A. The screen 40 illustrated in FIG. 4 is a screen allowing a user to select which one of the applications installed in the smartphone 1 is to be executed. The smartphone 1 executes the application selected on the screen 40 illustrated in FIG. 4 in the foreground. A screen of the application executed in the foreground is displayed on the display 2A. Hereinafter, for convenience of explanation, a screen on which a list of icons each corresponding to an application is displayed is described as a list screen.

Icons can be arranged on the list screen of the smartphone 1. A plurality of icons 50 are arranged on the list screen 40 illustrated in FIG. 4. Each of icons 50 is associated in advance with the corresponding application installed in the smartphone 1. When the smartphone 1 detects a gesture on an icon 50, the smartphone 1 executes the application associated with an icon 50 on which the gesture is detected. For example, when the smartphone 1 detects a tap on an icon 50 associated with a mail application, the smartphone 1 executes the mail application.

An icon 50 includes an image and a character string. An icon 50 may include a symbol or a figure instead of an image. An icon 50 may omit one of an image or a character string. Icons 50 are arranged based on a layout pattern. A wall paper 41 is displayed behind icons 50. A wall paper is also referred to as a photo screen, a back screen, an idle image, or a background image. The smartphone 1 can use any image as the wall paper 41. The smartphone 1 may allow a user to select the image to be displayed as the wall paper 41.

The smartphone 1 may have a plurality of list screens. The smartphone 1 determines the number of list screens based on a setting provided by a user, for example. Although the list screen may be provided in plurality, the smartphone 1 displays selected one of the list screens on the display 2A.

The smartphone 1 is capable of changing the list screen displayed on the display 2A. When a gesture is detected while one of the list screens is displayed, the smartphone 1 changes the list screen displayed on the display 2A to another list screen. For example, when a flick-to-right is detected, the smartphone 1 changes the list screen displayed on the display 2A to an adjacent list screen arranged on the left. As other example, when a flick-to-left is detected, the smartphone 1 changes the list screen displayed on the display 2A to an adjacent list screen arranged on the right. When a gesture is detected while a first list screen is displayed on the display 2A, the smartphone 1 changes the list screen displayed on the display 2A from the first list screen to a second list screen in such a manner that the first list screen displayed on the display 2A becomes gradually smaller and the second list screen displayed on the display 2A becomes gradually larger. Alternatively, the smartphone 1 may swap the list screens in such a manner that the first list screen is immediately replaced with the second list screen.

An area 42 is provided at the upper end of the display 2A. In the area 42, a remaining battery indicator 43 indicating the amount of remaining battery, and a signal level indicator 44 indicating the strength of the electric field of the electric waves used in the communication are displayed. The smartphone 1 may also display the time of the day, weather, an active application, a type of the communication system, calling status, device mode, events occurred in the device, and the like in the area 42. In this manner, the area 42 is used for providing various notifications to the user. The area 42 may also be provided to a screen other than the list screen 40. The position where the area 42 is provided is not limited to the upper end of the display 2A.

The list screen 40 illustrated in FIG. 4 is exemplary, and the forms and the arrangement of various elements, the number of the list screens 40, and various types of operations performed on the list screen 40 do not necessarily need to be as described herein.

Figure 5:
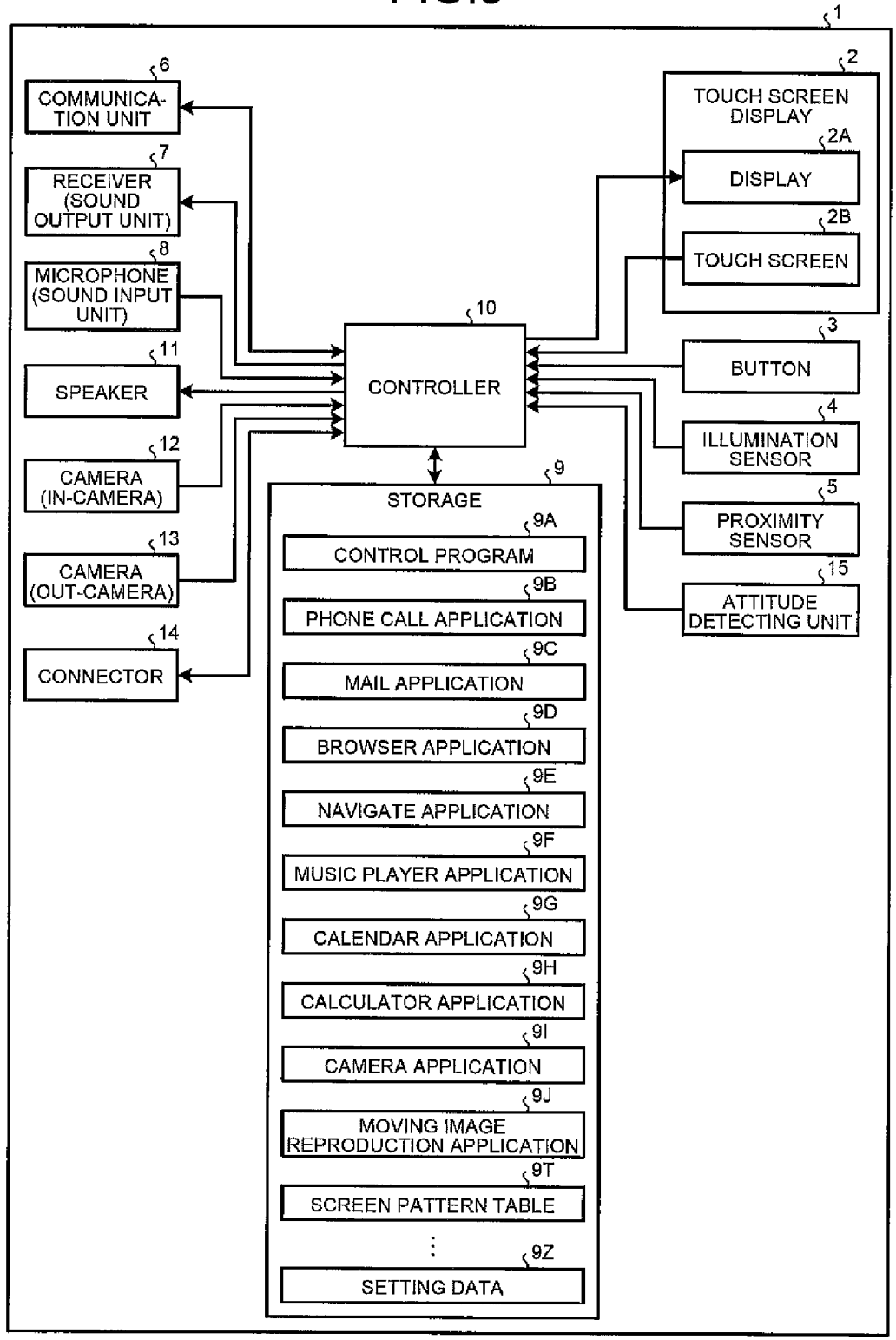
FIG. 5 is a block diagram of the smartphone.

FIG. 5 is a block diagram of the smartphone 1. The smartphone 1 includes the touch screen display 2, the buttons 3, the illumination sensor 4, the proximity sensor 5, communication unit 6, a receiver 7, the microphone 8, a storage 9, a controller 10, the speaker 11, the cameras 12 and 13, the connector 14, and an attitude detecting unit 15.

The touch screen display 2 includes the display 2A and the touch screen 2B, as mentioned earlier. The display 2A displays characters, images, symbols, figures, and the like. The touch screen 2B detects gestures.

The buttons 3 are operated by a user. The buttons 3 include the buttons 3A to 3F. The controller 10 detects an operation performed on the button 3 in cooperation with the button 3. Examples of the operation performed on the button 3 include, but are not limited to, a click, a double click, a triple click, a push, and a multi-push.

The buttons 3A to 3C are, for example, "Home" button, "Back" button, and "Menu" button, respectively. The button 3D is a power-on/off button for the smartphone 1, for example. The button 3D may also function as a sleep/wake-from-sleep button. The buttons 3E and 3F are volume buttons, for example.

The illumination sensor 4 detects the illuminance of the ambient light around the smartphone 1. Illuminance represents a light intensity, brightness, or luminance. The illumination sensor 4 is used in adjusting the luminance of the display 2A, for example. The proximity sensor 5 detects the presence of a nearby object in a non-contact fashion. The proximity sensor 5 detects the presence of an object based on a change in the magnetic field, or based on a change in the return time of an ultrasonic reflection wave, for example. The proximity sensor 5 detects a face approaching the touch screen display 2, for example. The illumination sensor 4 and the proximity sensor 5 may be configured as one sensor. The illumination sensor 4 may be used as a proximity sensor.

The communication unit 6 communicates wirelessly. The communication scheme supported by the communication unit 6 is wireless communication standard. Examples of the wireless communication standard include cellular phone communication standards such as 2G, 3G, and 4G. Examples of the cellular phone communication standards include Long Term Evolution (LTE), Wideband Code Division Multiple Access (W-CDMA), CDMA 2000, Personal Digital Cellular (PDC), Global System for Mobile Communications (GSM), and Personal Handy-phone System (PHS). Examples of the wireless communication standards further include Worldwide Interoperability for Microwave Access (WiMAX), IEEE 802.11, Bluetooth, Infrared Data Association (IrDA), Near Field Communication (NFC), etc.

The receiver 7 and the speaker 11 are sound output units. The receiver 7 and the speaker 11 output a sound signal received from the controller 10 as a sound. The receiver 7 is used to output the voice of a person on the other side of the telephone, for example. The speaker 11 is used to output a ringtone or a piece of music, for example. One of the receiver 7 and the speaker 11 may provide the function of the other. The microphone 8 is a sound input unit. The microphone 8 converts the voice of a user or the like into a sound signal, and transmits the signal to the controller 10.

The storage 9 stores therein computer programs and data. The storage 9 is used as a working area temporarily storing therein results of processes executed by the controller 10. The storage 9 may include any non-transitory storage medium such as a semiconductor storage medium and a magnetic storage medium. The storage 9 may include a plurality of types of storage media. The storage 9 may include a combination of a portable storage medium such as a memory card, an optical disc, or a magneto-optical disk, and a reader for the storage medium. The storage 9 may include a storage device to be used as a temporary storage area such as a random access memory (RAM).

The computer programs stored in the storage 9 include applications that are executed in the foreground or in the background, and control programs that support the operations of the applications. An application causes the display 2A to display a screen, and causes the controller 10 to execute a process corresponding to a gesture detected via the touch screen 2B, for example. The control program is, for example, an OS. Such applications and control programs may be installed in the storage 9 via wireless communication established by the communication unit 6, or via a non-transitory storage medium.

The storage 9 stores, for example, a control program 9A, a phone call application 9B, a mail application 9C, a browser application 9D, a navigate application 9E, a music player application 9F, a calendar application 9G, a calculator application 9H, a camera application 9I, a moving image reproduction application 9J, a screen pattern table 9T, setting data 9Z, etc. The phone call application 9B provides a phone call function for telephone calls through wireless communication. The mail application 9C provides an e-mail function for composition, transmission, reception, display, and the like of electronic mails. The browser application 9D provides a WEB browsing function for display of WEB pages. The navigate application 9E provides a navigation function for guiding a route and the like. The music player application 9F provides a player function for reproduction of music and output thereof from the receiver 7 or the speaker 11. The calendar application 9G provides a calendar function for schedule management and the like. The calculator application 9H provides a calculator function for, for example, four arithmetic operations. The camera application 9I provides an imaging function of images. The moving image reproduction application 9J provides a streaming function, or the like, for reproducing a multimedia file such as music or a moving image in real time while downloading it. The screen pattern table 9T is a table that is referred to when a screen pattern used to display the list screen 40 on the display 2A is determined, according to an attitude of the smartphone 1. The setting data 9Z includes information on various settings for operations of the smartphone 1.

The control program 9A provides a function related to various controls for operating the smartphone 1. The control program 9A controls, for example, the communication unit 6 to perform communication with an external device. Alternatively, the control program 9A controls the communication unit 6, the receiver 7, the microphone 8, and the like to make a phone call. The functions provided by the control program 9A include a function of performing various controls such as changing information displayed on the display 2A according to a gesture detected through the touch screen 2B. The functions provided by the control program 9A include a function of changing an orientation of the screen on the display 2A according to a detection result of the attitude detecting unit 15. The function provided by the control program 9A can be used in combination with a function provided by other programs such as the mail application 9C. Furthermore, the functions provided by the control program 9A include a function of displaying the list screen 40 where icons 50 are arranged in the first pattern on the display 2A when the first attitude of the smartphone 1 is detected, and of displaying the list screen 40 where icons 50 are arranged in the second pattern on the display 2A when the second attitude of the smartphone 1 is detected.

The orientation of the screen in the embodiments may be specified based on an orientation of the displayed character and/or image. For example, when the characters for indicating contents of an icon 50 or the like is displayed in a normal state, an upward direction of the characters is an upward direction of the screen and a downward direction of the characters is a downward direction of the screen. Although there is a case in which the characters in various directions are displayed on the display 2A regardless of the orientation of the screen, in this case, a top-to-bottom direction of the screen may be specified based on the direction of a reference character. Alternatively, when the list screen 40 is displayed on the display 2A, the side where the area 42 is displayed may be specified as an upward direction and the opposite side to the side where the area 42 is displayed may be specified as an upward direction.

In the present application, examples of activating a computer program (an application) by the controller 10 include: reading newly the computer program stored in the storage 9 and starting the process thereof; and starting newly the process of a computer program that has already been read. In the present application, examples of executing a computer program (an application) by the controller 10 include: activating the computer program; resuming the computer program that is currently suspended; and continuing the process of the computer program that has been activated.

The controller 10 is a processor. Examples of the processor include, but are not limited to, a central processing unit (CPU), a system-on-a-chip (SoC), a micro control unit (MCU), and a field-programmable gate array (FPGA). The controller 10 implements various functions by integrally controlling the operation of the smartphone 1.

Specifically, the controller 10 executes instructions included in the computer programs stored in the storage 9 while referring to the data stored in the storage 9 as required. The controller 10 then implements various functions by controlling functional units based on the data and the instructions. Examples of the functional unit include, but are not limited to, the display 2A, the communication unit 6, the microphone 8, and the speaker 11. The controller 10 may change the control based on the detection results of detecting units. Examples of the detecting unit include, but are not limited to, the touch screen 2B, the buttons 3, the illumination sensor 4, the proximity sensor 5, the receiver 7, the camera 12, the camera 13, and the attitude detecting unit 15.

For example, the controller 10 executes the control program 9A to thereby display the list screen 40 where icons 50 are arranged in the first pattern on the display 2A when the first attitude of the smartphone 1 is detected, and display the list screen 40 where icons 50 are arranged in the second pattern on the display 2A when the second attitude of the smartphone 1 is detected.

The camera 12 is an in-camera for capturing an image of an object facing the front face 1A. The camera 13 is an out-camera for capturing an image of an object facing the back face 1B.

The connector 14 is a connector terminal to which another device is connected. The connector 14 may be a general terminal such as a universal serial bus (USB), High-Definition Multimedia Interface (HDMI), Light Peak (Thunderbolt), or an earphone and microphone connector. The connector 14 may be a dedicated terminal such as a Dock connector. Examples of the device connected to the connector 14 include, but are not limited to, an external storage, a speaker, and a communication device.

The attitude detecting unit 15 detects an attitude of the smartphone 1. The attitude detecting unit 15 includes at least one of an accelerometer, a direction sensor, and a gyroscope to detect an attitude of the smartphone 1. The accelerometer detects the direction and the amount of the acceleration working on the smartphone 1. The direction sensor detects the direction of geomagnetism. The gyroscope detects an angle and an angular velocity of the smartphone 1. The detection results of the accelerometer, the direction sensor, and the gyroscope are used in combination to detect a change in the attitude of the smartphone 1.

The part or the whole of the computer programs and the data stored in the storage 9 in FIG. 5 may be downloaded from another device over wireless communication established by the communication unit 6. The part or the whole of the computer programs and the data stored in the storage 9 in FIG. 5 may be stored in a non-transitory storage medium readable by a reader included in the storage 9. The part or the whole of the computer programs and the data stored in the storage 9 in FIG. 5 may be stored in a non-transitory storage medium readable by a reader connected to the connector 14. Examples of the non-transitory storage medium include, but are not limited to, an optical disk such as a compact disc (CD), a digital versatile disc (DVD), and a Blu-ray, a magneto-optical disk, a magnetic storage medium, a memory card, and a solid-state storage medium.

The configuration of the smartphone 1 illustrated in FIG. 5 is exemplary, and may be modified as appropriate as long as the essence of the present invention is not impaired. For example, the number and the type of the buttons 3 are not limited to an example illustrated in FIG. 5. As the buttons for making operations related to the screen, the smartphone 1 may be provided with buttons in the arrangement of a numeric key pad or in a QWERTY layout, instead of the buttons 3A to 3C. The smartphone 1 may be provided with only one button for making operations related to the screen, or may be provided with no button. In an example illustrated in FIG. 5, the smartphone 1 is provided with two cameras, but the smartphone 1 may be provided with only one camera, or may be provided with no camera. In an example illustrated in FIG. 5, the smartphone 1 is provided with the three types of sensors for detecting the position and the attitude, but the smartphone 1 may not have some of these sensors, or may have other various sensor(s) which is(are) detecting at least one of the position and the attitude.

Figure 6:
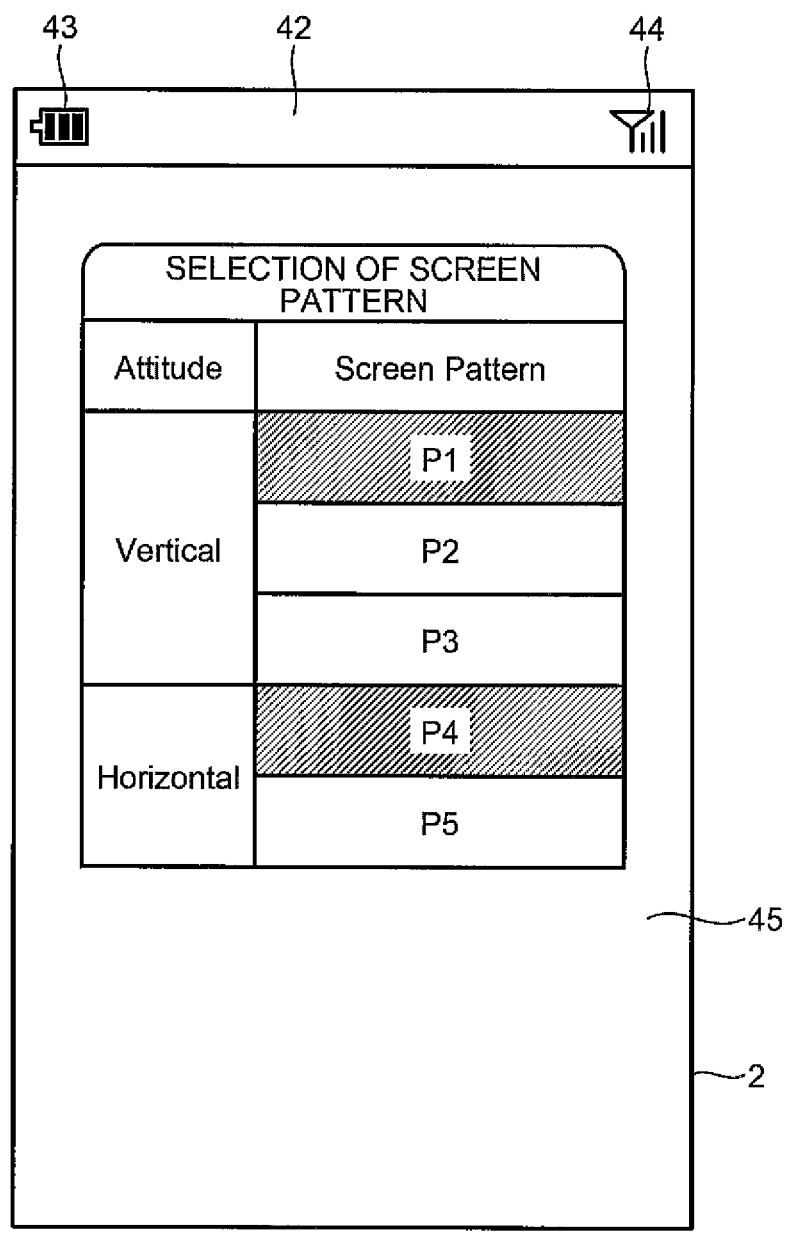
FIG. 6 is a diagram of an example of a user interface used to select a screen pattern.

FIG. 6 is a diagram of an example of a user interface used to select a screen pattern. Information for the screen pattern table 9T stored in the storage 9 is set by the user through a user interface 45 illustrated in FIG. 6. As illustrated in FIG. 6, the user interface 45 used to select a screen pattern is configured in a state where a screen pattern can be set for each attitude of the smartphone 1. For example, when the attitude of the smartphone 1 is "vertical", the user can select any one of "P1", "P2", and "P3" as a screen pattern. On the other hand, when the attitude of the smartphone 1 is "horizontal", the user can select either one of "P4" and "P5". For example, when detecting a touch operation performed on an image indicated as "P1", the smartphone 1 sets "P1" as the screen pattern.

Figure 7:
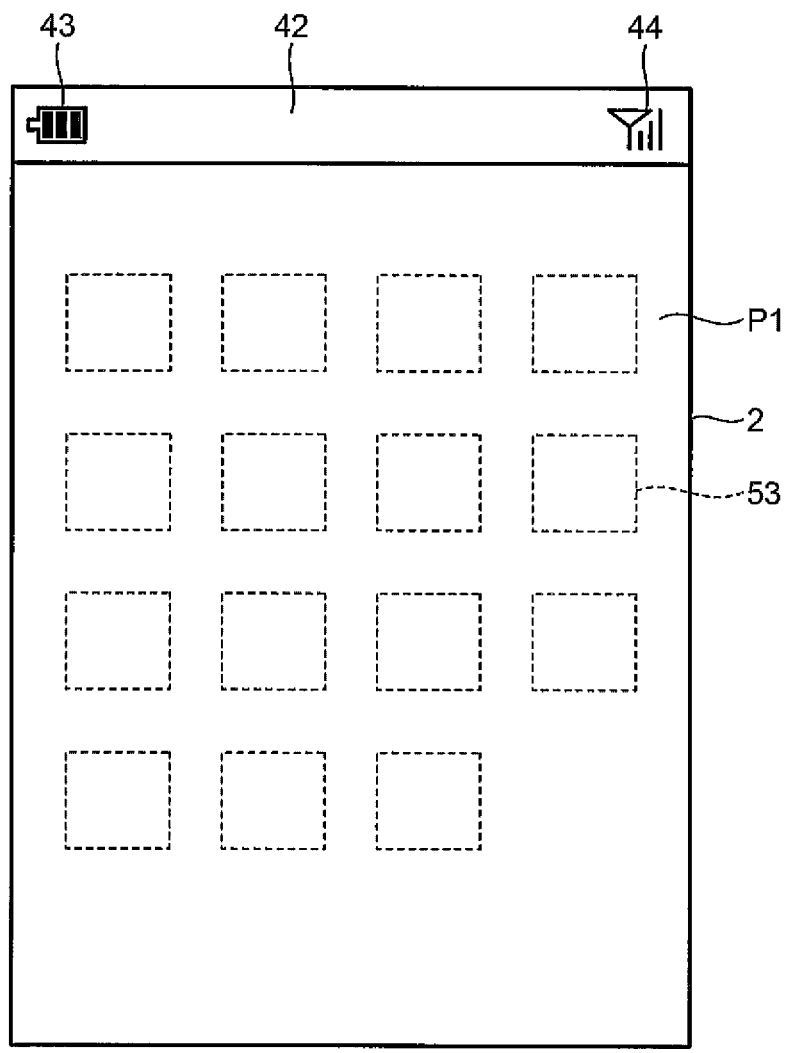
FIG. 7 is a diagram of an example of the screen pattern according to Embodiment 1.
Figure 8:
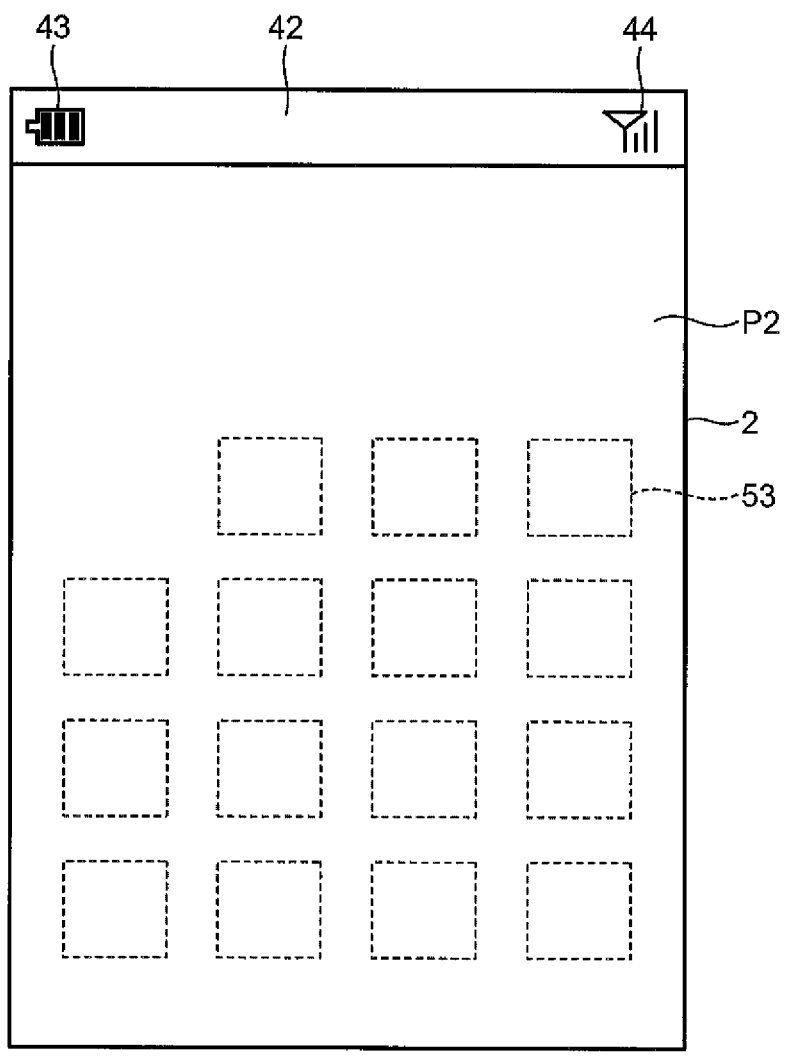
FIG. 8 is a diagram of an example of the screen pattern according to Embodiment 1.
Figure 9:
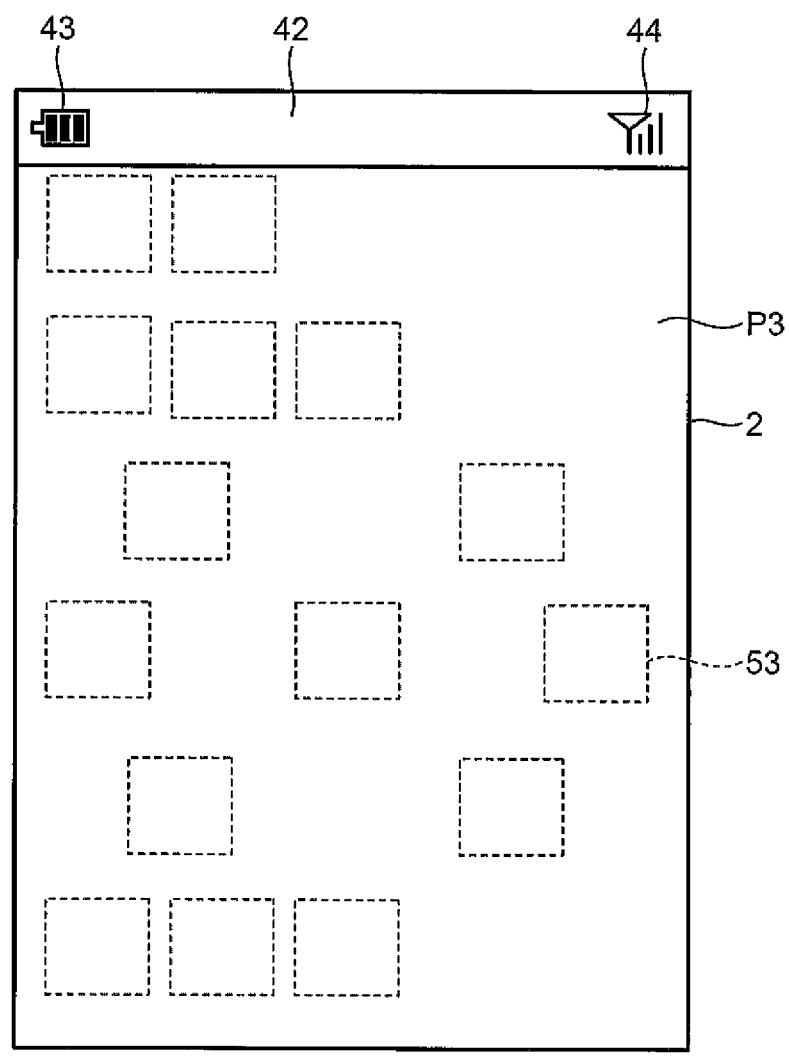
FIG. 9 is a diagram of an example of the screen pattern according to Embodiment 1.

FIG. 7 to FIG. 11 are diagrams of examples of the screen pattern according to Embodiment 1. FIG. 7 to FIG. 11 are examples of the screen pattern used when the attitude of the smartphone 1 is vertical. An example illustrated in FIG. 7 is an example when "P1", which is one of the screen patterns used when the attitude of the smartphone 1 is vertical, is displayed over the touch screen display 2. Positions 53 arranged in each of the screen patterns illustrated in FIG. 7 to FIG. 11 are positions where icons 50 are arranged at the time of displaying the list screen 40, and are different for each pattern. The list screen 40 when the screen pattern "P1" illustrated in FIG. 7 is used becomes, for example, the state illustrated in FIG. 4. The example illustrated in FIG. 8 is one of examples when "P2", which is one of the screen patterns used when the attitude of the smartphone 1 is vertical, is displayed over the touch screen display 2. The example illustrated in FIG. 9 is an example when "P3", which is one of the screen patterns used when the attitude of the smartphone 1 is vertical, is displayed over the touch screen display 2.

Figure 10:
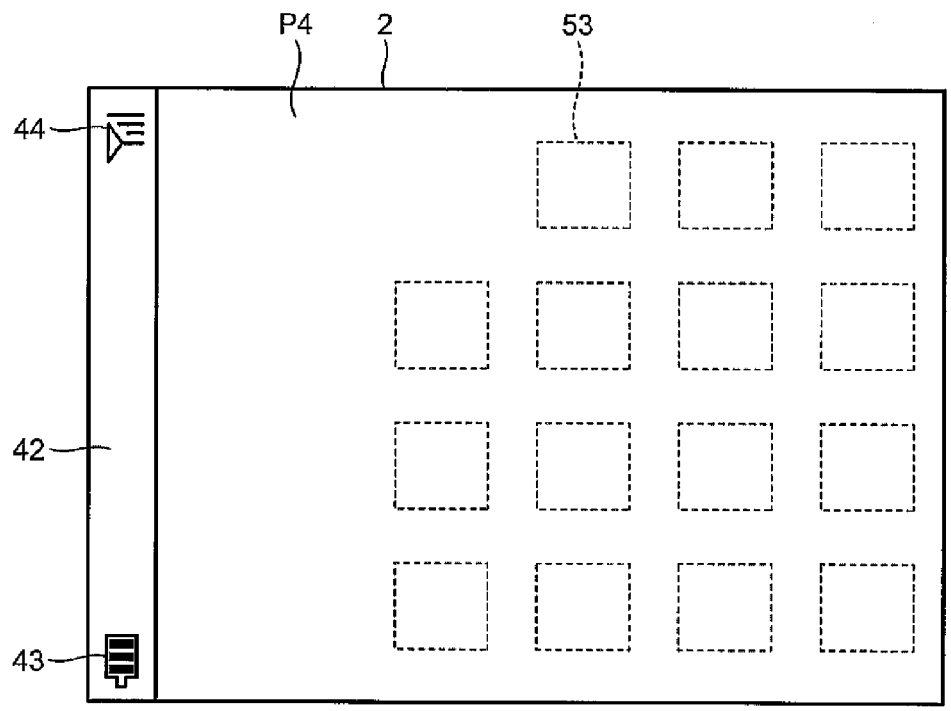
FIG. 10 is a diagram of an example of the screen pattern according to Embodiment 1.
Figure 11:
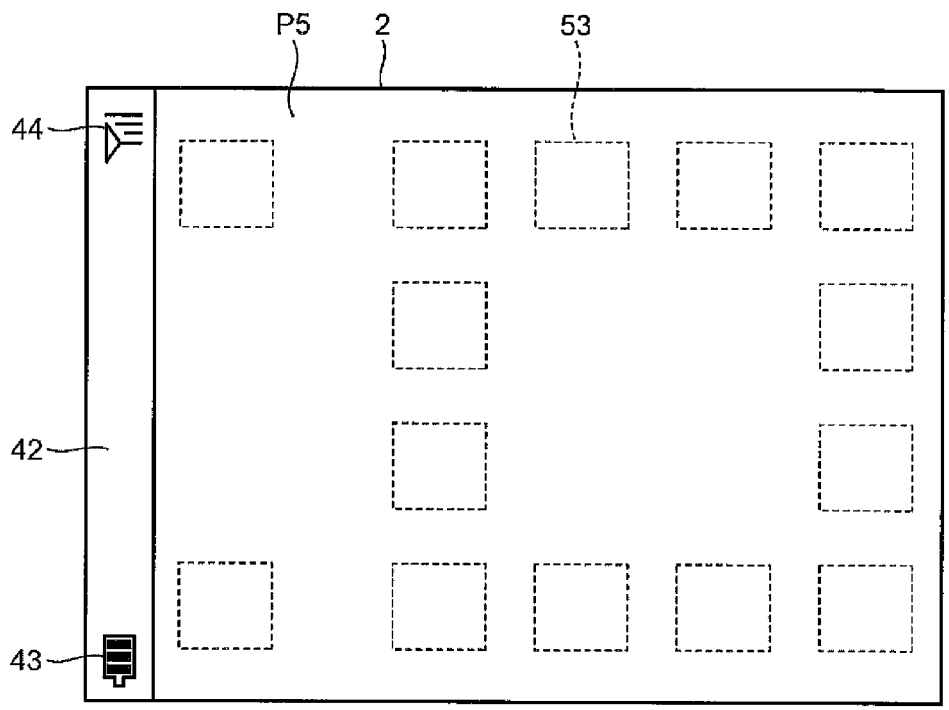
FIG. 11 is a diagram of an example of the screen pattern according to Embodiment 1.

FIG. 10 and FIG. 11 are examples of the screen pattern used when the attitude of the smartphone 1 is horizontal. The example illustrated in FIG. 10 is one of examples when "P4", which is one of the screen patterns used when the attitude of the smartphone 1 is horizontal, is displayed over the touch screen display 2. The example illustrated in FIG. 11 is one of examples when "P5", which is one of the screen patterns used when the attitude of the smartphone 1 is horizontal, is displayed over the touch screen display 2.

The screen patterns illustrated in FIG. 7 to FIG. 11 are examples, and therefore the screen patterns are not limited thereto. Correspondence of the case where the attitude of the smartphone 1 is vertical or of the case where the attitude of the smartphone 1 is horizontal to any condition will be explained in detail below.

FIG. 12 to FIG. 17 are diagrams of examples of control based on a function provided by the control program 9A according to Embodiment 1. In the present embodiment, a direction (direction of gravitational acceleration) parallel to the surface of the touch screen display 2 is represented by arrow g. In the present embodiment, a case where the direction of the arrow g is a direction parallel to the surface of the touch screen display 2 will be explained; however, the condition is not limited thereto. For example, the surface of the touch screen display 2 may be inclined with respect to the direction of the arrow g.

Figure 12:
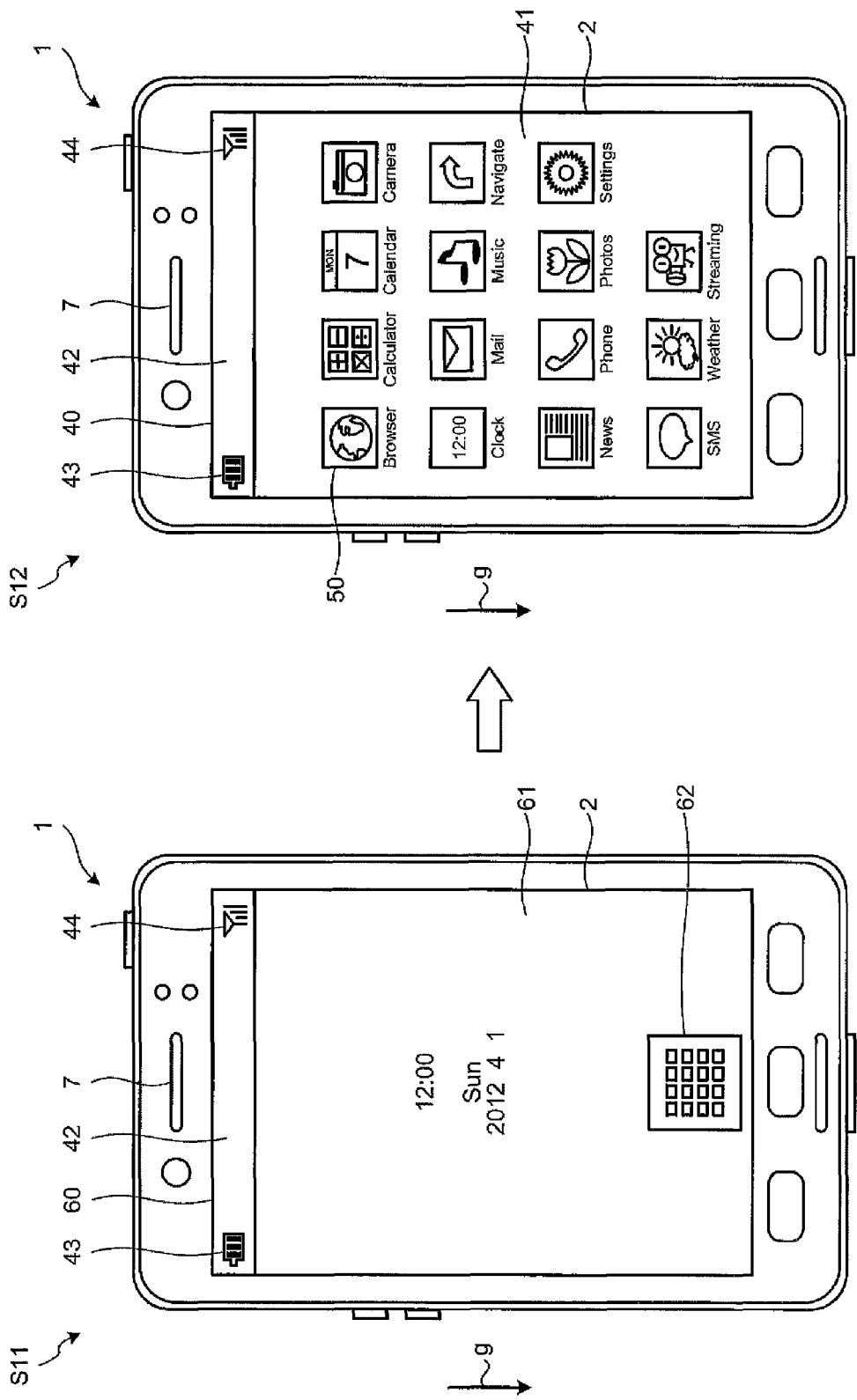
FIG. 12 is a diagram of an example of control based on a function provided by a control program according to Embodiment 1.

As illustrated in FIG. 12, the smartphone 1 is held in an attitude so that the direction of the long side of the housing 20 (e.g., see FIG. 1) is parallel to the direction of the arrow g, and displays an idle screen 60 on the touch screen display 2 (Step S11). For example, information for time and date is displayed on a wallpaper 61 of the idle screen 60, and an operating portion 62 for causing the touch screen display 2 to display the list screen 40 is also provided thereon. In the following embodiments, an attitude of the smartphone 1 when the direction of the long side of the housing 20 (e.g., see FIG. 1) is a direction parallel to the direction of the arrow g is described as a vertical attitude.

Subsequently, when detecting an operation performed on the operating portion 62, the smartphone 1 uses a screen pattern according to the current attitude to display the list screen 40 on the touch screen display 2 (Step S12). It is assumed that, for example, "P1" is set as the screen pattern used for the vertical attitude in the screen pattern table 9T. In this case, when it is determined that the current attitude is the vertical attitude, the smartphone 1 determines the screen pattern to "P1" based on the screen pattern table 9T. Subsequently, the smartphone 1 displays the list screen 40, where icons 50 are arranged according to "P1" which is the determined screen pattern, on the touch screen display 2 (display 2A) as illustrated at Step S12. Among the positions 53 arranged in the screen pattern "P1" illustrated in FIG. 7, in which position each of icons 50 is arranged may be previously set in the smartphone 1 or may be arbitrarily determined when the smartphone 1 arranges them.

Figure 13:
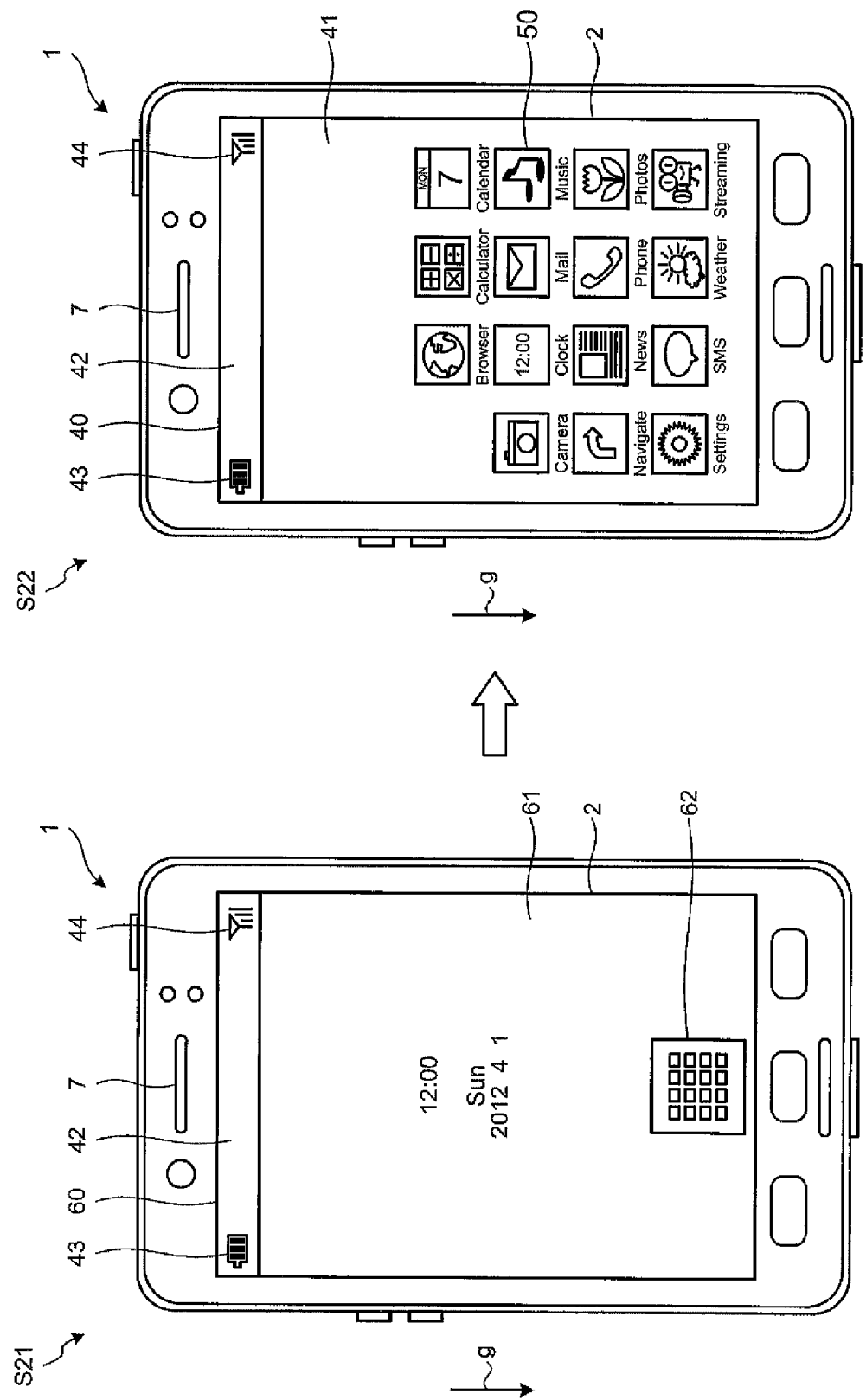
FIG. 13 is a diagram of an example of the control based on the function provided by the control program according to Embodiment 1.

As illustrated in FIG. 13, the smartphone 1 is held in the vertical attitude and displays the idle screen 60 on the touch screen display 2 (Step S21). Subsequently, when detecting an operation performed on the operating portion 62, the smartphone 1 uses a screen pattern according to the current attitude to display the list screen 40 on the touch screen display 2 (Step S22). It is assumed that, for example, "P2" is set as the screen pattern used for the vertical attitude in the screen pattern table 9T. In this case, when it is determined that the current attitude is the vertical attitude, the smartphone 1 determines the screen pattern to "P2" based on the screen pattern table 9T. Subsequently, the smartphone 1 displays the list screen 40, where icons 50 are arranged according to "P2" which is the determined screen pattern, on the touch screen display 2 (display 2A) as illustrated at Step S22. Among the positions 53 arranged in the screen pattern "P2" illustrated in FIG. 8, in which position each of icons 50 is arranged may be previously set in the smartphone 1 or may be arbitrarily determined when the smartphone 1 arranges them.

Figure 14:
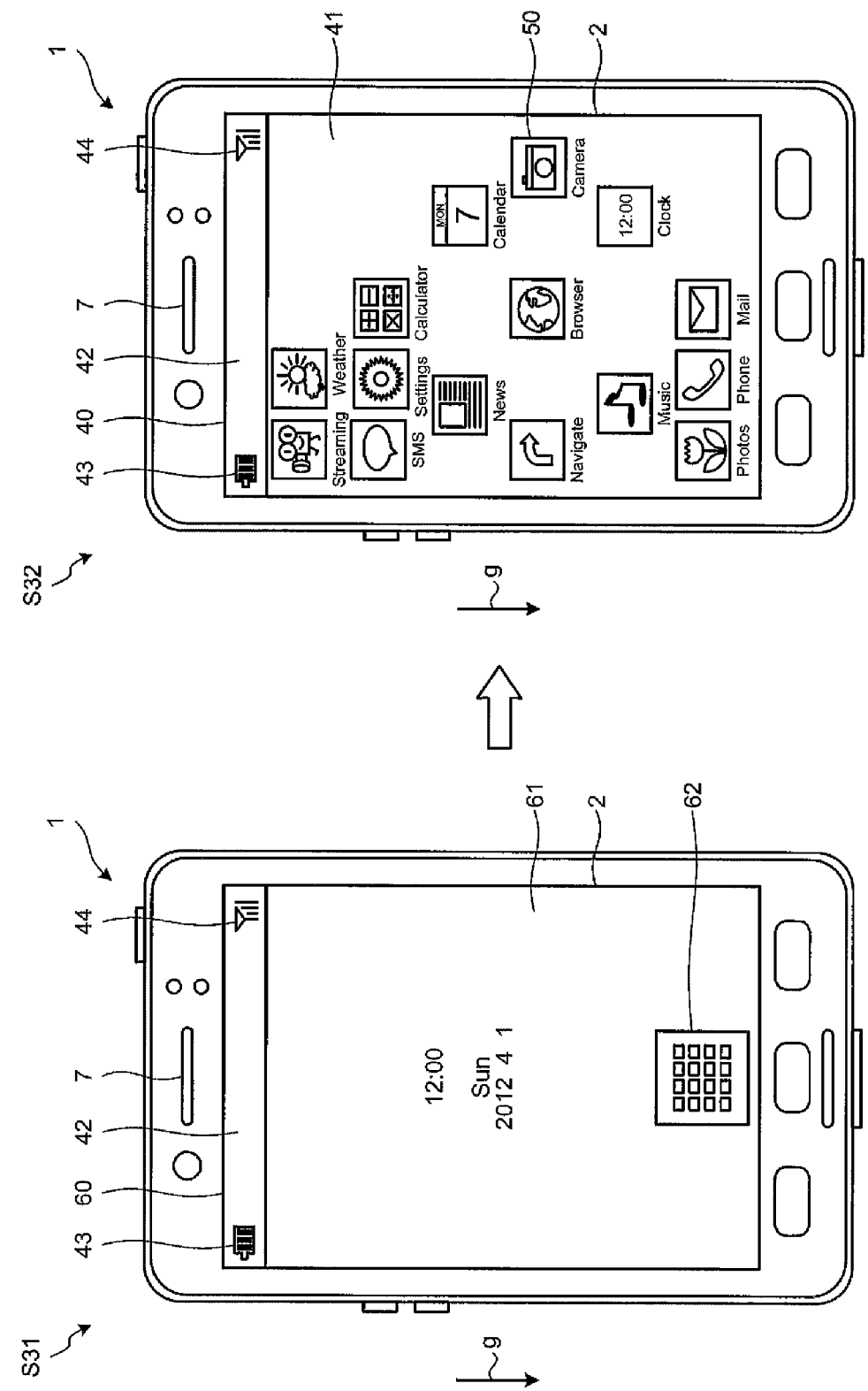
FIG. 14 is a diagram of an example of the control based on the function provided by the control program according to Embodiment 1.

As illustrated in FIG. 14, the smartphone 1 is held in the vertical attitude and displays the idle screen 60 on the touch screen display 2 (Step S31). Subsequently, when detecting an operation performed on the operating portion 62, the smartphone 1 uses a screen pattern according to the attitude to display the list screen 40 on the touch screen display 2 (Step S32). It is assumed that, for example, "P3" is set as the screen pattern used for the vertical attitude in the screen pattern table 9T. In this case, when it is determined that the current attitude is the vertical attitude, the smartphone 1 determines the screen pattern to "P3" based on the screen pattern table 9T. Subsequently, the smartphone 1 displays the list screen 40, where icons 50 are arranged according to "P3" which is the determined screen pattern, on the touch screen display 2 (display 2A) as illustrated at Step S32. Among the positions 53 arranged in the screen pattern "P3" illustrated in FIG. 9, in which position each of icons 50 is arranged may be previously set in the smartphone 1 or may be arbitrarily determined when the smartphone 1 arranges them.

Figure 15:
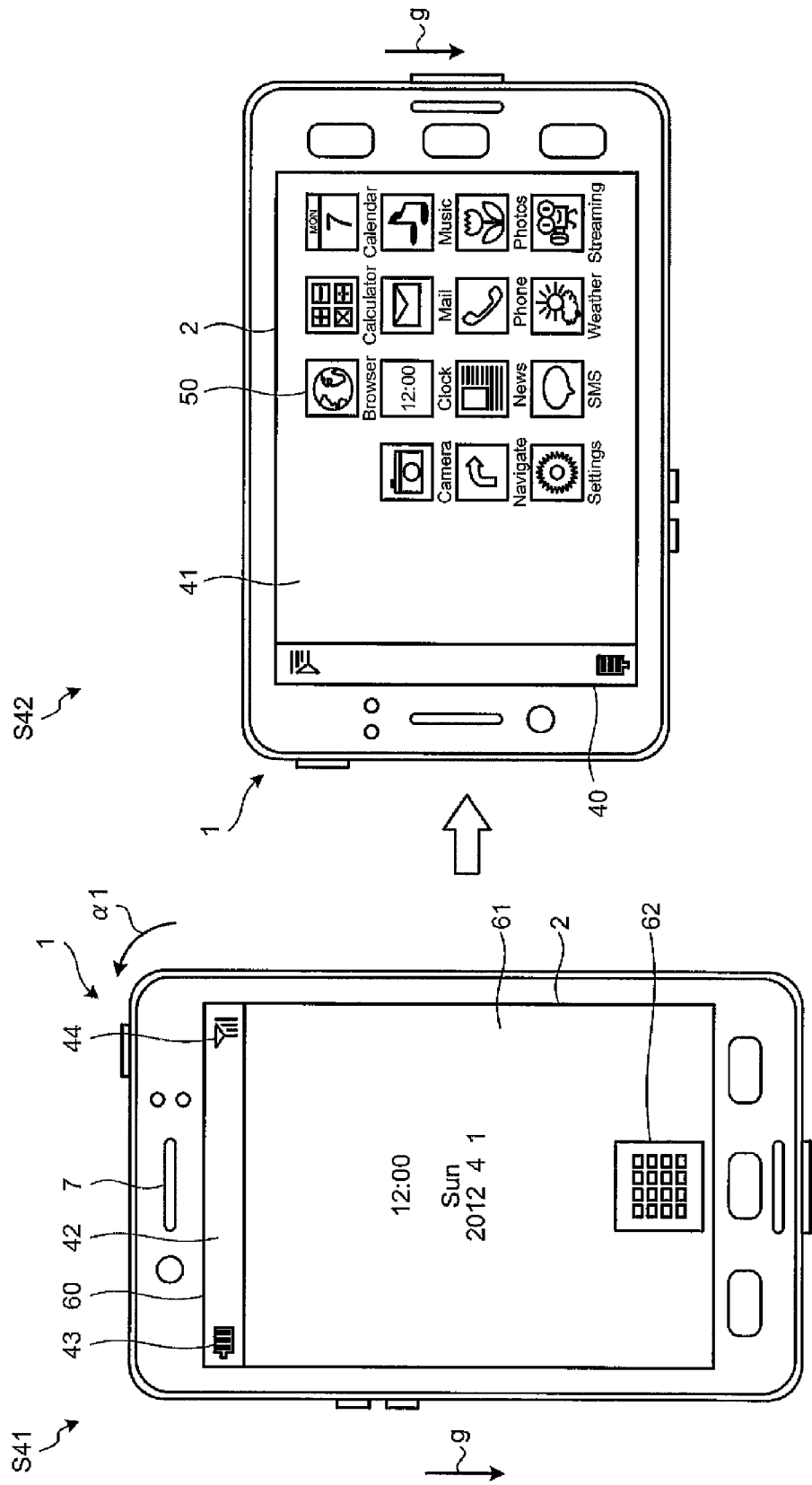
FIG. 15 is a diagram of an example of the control based on the function provided by the control program according to Embodiment 1.

As illustrated in FIG. 15, the smartphone 1 is held in the vertical attitude and displays the idle screen 60 on the touch screen display 2 (Step S41).

The user rotates the smartphone 1 in a direction of arrow α1 and changes the attitude of the smartphone 1 from the state illustrated at Step S41 to the state illustrated at Step S42. Specifically, the user rotates the smartphone 1 in the direction of arrow α1 using a line perpendicular to the surface of the touch screen display 2 as an axis until the direction of the long side of the housing 20 (e.g., see FIG. 1) of the smartphone 1 becomes a direction orthogonal to the direction of the arrow g. In the following embodiments, an attitude of the smartphone 1 when the direction of the long side of the housing 20 (e.g., see FIG. 1) is a direction orthogonal to the direction of the arrow g is described as a horizontal attitude.

When detecting the change of the attitude, the smartphone 1 changes the orientation of the screen so that the orientation of the screen becomes an orientation in which a screen top-to-bottom direction of the idle screen 60 displayed on the touch screen display 2 coincides with the top-to-bottom direction of the housing 20 (e.g., see FIG. 1) i.e. with the direction of the arrow g (direction of gravitational acceleration), based on the detection result of the attitude.

Furthermore, when detecting an operation performed on the operating portion 62, the smartphone 1 uses a screen pattern according to the attitude to display the list screen 40 on the touch screen display 2 (Step S42). It is assumed that, for example, "P4" is set as the screen pattern used for the horizontal attitude in the screen pattern table 9T. In this case, when it is determined that the current attitude is the horizontal attitude, the smartphone 1 determines the screen pattern to "P4" based on the screen pattern table 9T. Subsequently, the smartphone 1 displays the list screen 40, where icons 50 are arranged according to "P4" which is the determined screen pattern, on the touch screen display 2 (display 2A) as illustrated at Step S42. Among the positions 53 arranged in the screen pattern "P4" illustrated in FIG. 10, in which position each of icons 50 is arranged may be previously set in the smartphone 1 or may be arbitrarily determined when the smartphone 1 arranges them.

Figure 16:
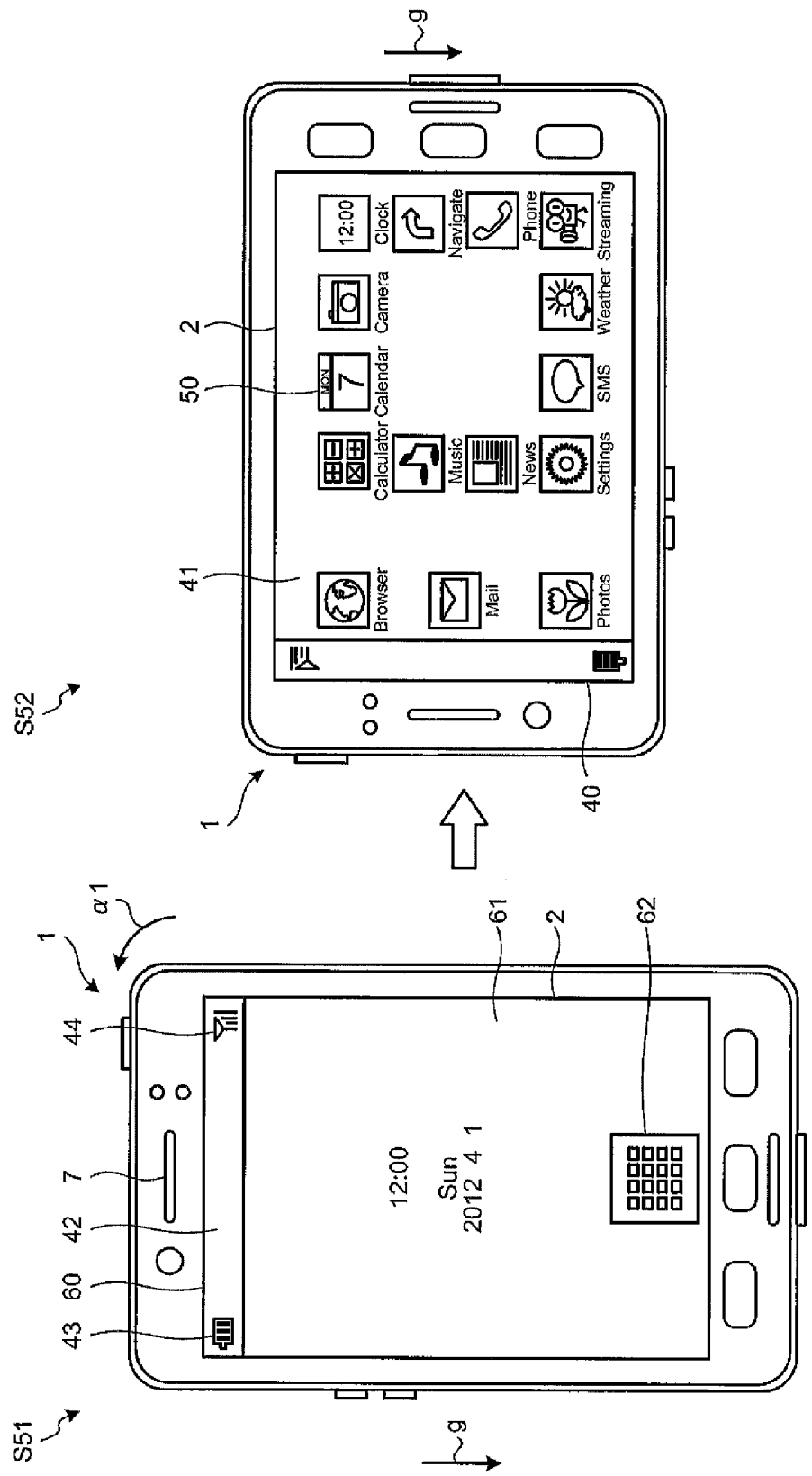
FIG. 16 is a diagram of an example of the control based on the function provided by the control program according to Embodiment 1.

As illustrated in FIG. 16, the smartphone 1 is held in the vertical attitude and displays the idle screen 60 on the touch screen display 2 (Step S51).

The user rotates the smartphone 1 in the direction of arrow α1 and changes the attitude of the smartphone 1 from the state illustrated at Step S51 to the state illustrated at Step S52. That is, the user changes the attitude of the smartphone 1 from the vertical attitude to the horizontal attitude.

When detecting the change of the attitude, the smartphone 1 changes the orientation of the screen so that the orientation of the screen becomes an orientation in which the screen top-to-bottom direction of the idle screen 60 displayed on the touch screen display 2 coincides with the top-to-bottom direction of the housing 20 (e.g., see FIG. 1) i.e. with the direction of the arrow g (direction of gravitational acceleration), based on the detection result of the attitude.

Furthermore, when detecting an operation performed on the operating portion 62, the smartphone 1 uses a screen pattern according to the attitude to display the list screen 40 on the touch screen display 2 (Step S52). It is assumed that, for example, "P5" is set as the screen pattern used for the horizontal attitude in the screen pattern table 9T. In this case, when it is determined that the current attitude is the horizontal attitude, the smartphone 1 determines the screen pattern to "P5" based on the screen pattern table 9T. Subsequently, the smartphone 1 displays the list screen 40, where icons 50 are arranged according to "P5" which is the determined screen pattern, on the touch screen display 2 (display 2A) as illustrated at Step S52. Among the positions 53 arranged in the screen pattern "P5" illustrated in FIG. 11, in which position each of icons 50 is arranged may be previously set in the smartphone 1 or may be arbitrarily determined when the smartphone 1 arranges them.

Examples of the control when the list screen 40 is displayed on the display 2A have been explained with reference to FIG. 12 to FIG. 16. An example of the control when the attitude of the smartphone 1 is changed during display of the list screen 40 will be explained below with reference to FIG. 17.

Figure 17:
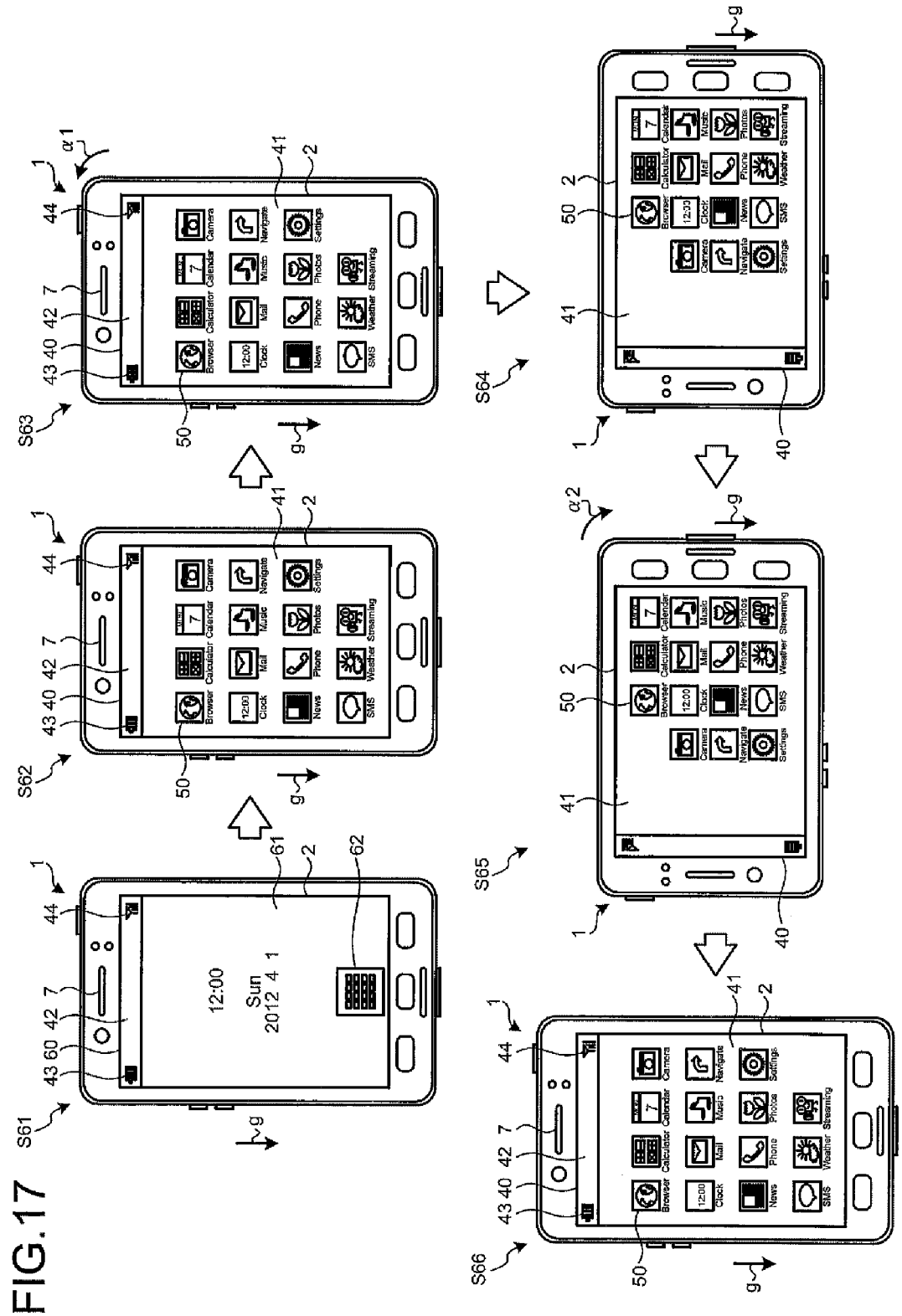
FIG. 17 is a diagram of an example of the control based on the function provided by the control program according to Embodiment 1.

As illustrated in FIG. 17, the smartphone 1 displays the idle screen 60 on the touch screen display 2 (Step S61).

Subsequently, when detecting an operation performed on the operating portion 62, the smartphone 1 uses a screen pattern according to the attitude to display the list screen 40 on the touch screen display 2 (Step S62). For example, the smartphone 1 determines a screen pattern used when the current attitude is the vertical attitude based on the screen pattern table 9T, and displays the list screen 40 on the touch screen display 2 using the determined screen pattern as illustrated at Step S62.

The user rotates the smartphone 1 in the direction of arrow α1 and changes the attitude of the smartphone 1 from the state of Step S63 to the state of Step S64. That is, the user changes the attitude of the smartphone 1 from the vertical attitude to the horizontal attitude (Step S63 to Step S64).

When detecting the change of the attitude, the smartphone 1 changes the orientation of the screen so that the orientation of the screen becomes an orientation in which the screen top-to-bottom direction of the list screen 40 displayed on the touch screen display 2 coincides with the top-to-bottom direction of the housing 20 (e.g., see FIG. 1) i.e. with the direction of the arrow g (direction of gravitational acceleration), based on the detection result of the attitude.

Furthermore, the smartphone 1 again determines a screen pattern according to the changed attitude and displays the list screen 40 on the touch screen display 2 using the determined screen pattern (Step S64). For example, the smartphone 1 determines a screen pattern used when the current attitude is the horizontal attitude based on the screen pattern table 9T, and displays the list screen 40 on the touch screen display 2 using the determined screen pattern as illustrated at Step S64.

The user rotates the smartphone 1 in a direction of arrow α2 and changes the attitude of the smartphone 1 from the state of Step S65 to the state of Step S66. That is, the user changes the attitude of the smartphone 1 from the horizontal attitude to the vertical attitude (Step S65 to Step S66).

When detecting the change of the attitude, the smartphone 1 changes the orientation of the screen so that the orientation of the screen becomes an orientation in which the screen top-to-bottom direction of the list screen 40 displayed on the touch screen display 2 coincides with the top-to-bottom direction of the housing 20 (e.g., see FIG. 1) i.e. with the direction of the arrow g (direction of gravitational acceleration), based on the detection result of the attitude.

Furthermore, the smartphone 1 again determines a screen pattern according to the changed attitude and displays the list screen 40 on the touch screen display 2 using the determined screen pattern (Step S66). For example, the smartphone 1 determines a screen pattern used when the current attitude is the vertical attitude based on the screen pattern table 9T, and displays the list screen 40 on the touch screen display 2 using the determined screen pattern as illustrated at Step S66. In other words, when the attitude of the smartphone 1 is returned from the horizontal attitude to the vertical attitude, the smartphone 1 again uses the same screen pattern as that of Step S62 to display the list screen 40 on the touch screen display 2.

Figure 18:
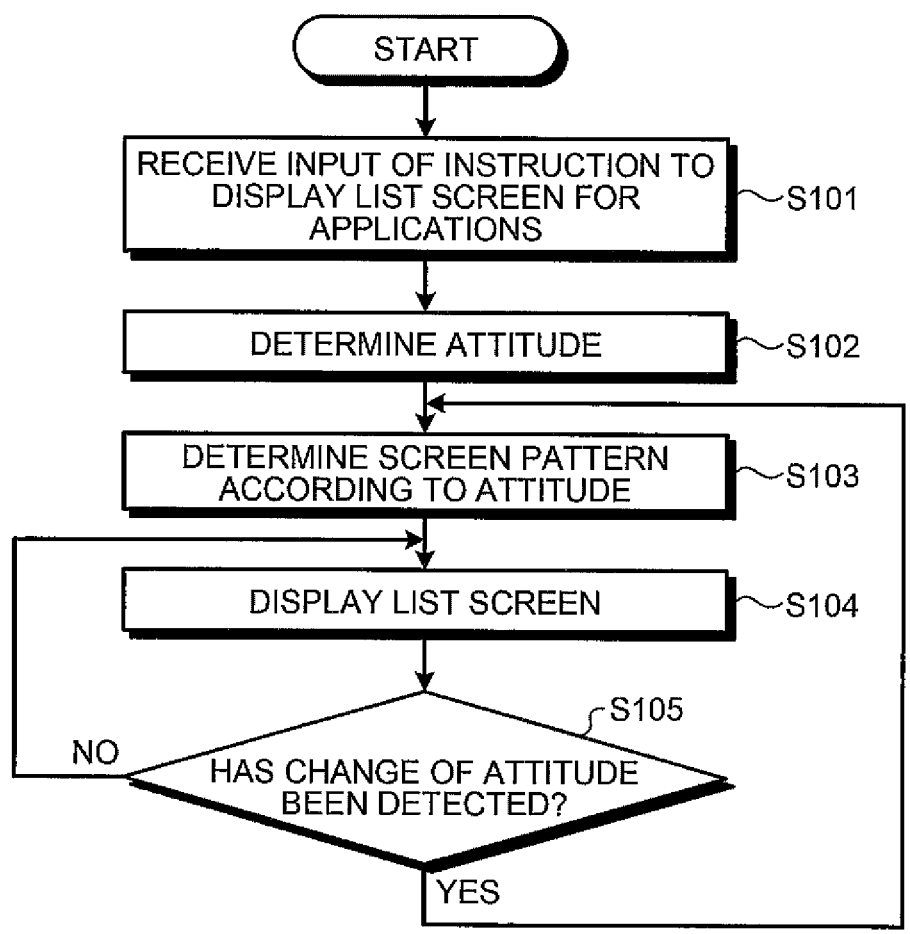
FIG. 18 is a diagram of an example of a processing procedure of the control based on the function provided by the control program according to Embodiment 1.

FIG. 18 is a diagram of an example of a processing procedure of the control based on the function provided by the control program 9A. The processing procedure illustrated in FIG. 18 is implemented by the controller 10 executing the control program 9A. The processing procedure illustrated in FIG. 18 is repeatedly executed while the smartphone 1 operates, for example.

As illustrated in FIG. 18, when receiving an input of an instruction (operation performed on the operating portion 62) to display the list screen 40 for applications at Step S101, then at Step S102, the controller 10 determines an attitude based on the detection result of the attitude detecting unit 15.

After the determination of the attitude, at Step S103, the controller 10 determines a screen pattern according to the attitude based on the screen pattern table 9T stored in the storage 9. Then, at Step S104, the controller 10 displays the list screen 40 on the touch screen display 2 using the screen pattern determined at Step S103.

Subsequently, at Step S105, the controller 10 determines whether the change of the attitude has been detected by the attitude detecting unit 15. When the change of the attitude has been detected as the result of determination (Yes at Step S105), the controller 10 returns to Step S103 and again determines a screen pattern according to the attitude. Meanwhile, when the change of the attitude has not been detected as the result of determination (No at Step S105), the controller 10 returns to Step S104.

As explained above, in Embodiment 1, when detecting the first attitude (vertical attitude) of the smartphone 1, the smartphone 1 displays the list screen 40 where icons 50 are arranged in the first pattern (screen pattern corresponding to the vertical attitude) on the display 2A. Furthermore, when detecting the second attitude (horizontal attitude) of the smartphone 1, the smartphone 1 displays the list screen 40 where icons 50 are arranged in the second pattern (screen pattern corresponding to the horizontal attitude) on the display 2A. Therefore, according to Embodiment 1, the user's convenience can be improved.

Second Embodiment

Embodiment 1 has explained an example of displaying the list screen 40 using the screen pattern according to the attitude of the smartphone 1. In the following, Embodiment 2 will explain an example of determining positions where icons 50 are arranged according to actual usage of applications when the list screen 40, on which icons 50 are arranged in the screen pattern according to an attitude, is to be displayed.

FIG. 19 is a diagram of an example of actual usage of applications stored in the storage 9 according to Embodiment 2. The actual usage of applications is written to, for example, the setting data 9Z of the storage 9. As illustrated in FIG. 19, the smartphone 1 stores the number of executions and the cumulative number of executions of applications as the actual usage for each application. For example, the number of executions may be the number of times per day on the previous day, may be the number of executions for several days or several weeks up to the previous day, or may be the number of executions within a predetermined time of the day. The cumulative number of executions may be the cumulative number of times since the start of use of the smartphone 1, or may be the cumulative number of times for several months or for several years. The smartphone 1 may manage the data so that the number of executions is at least less than the cumulative number of executions.

Figure 20:
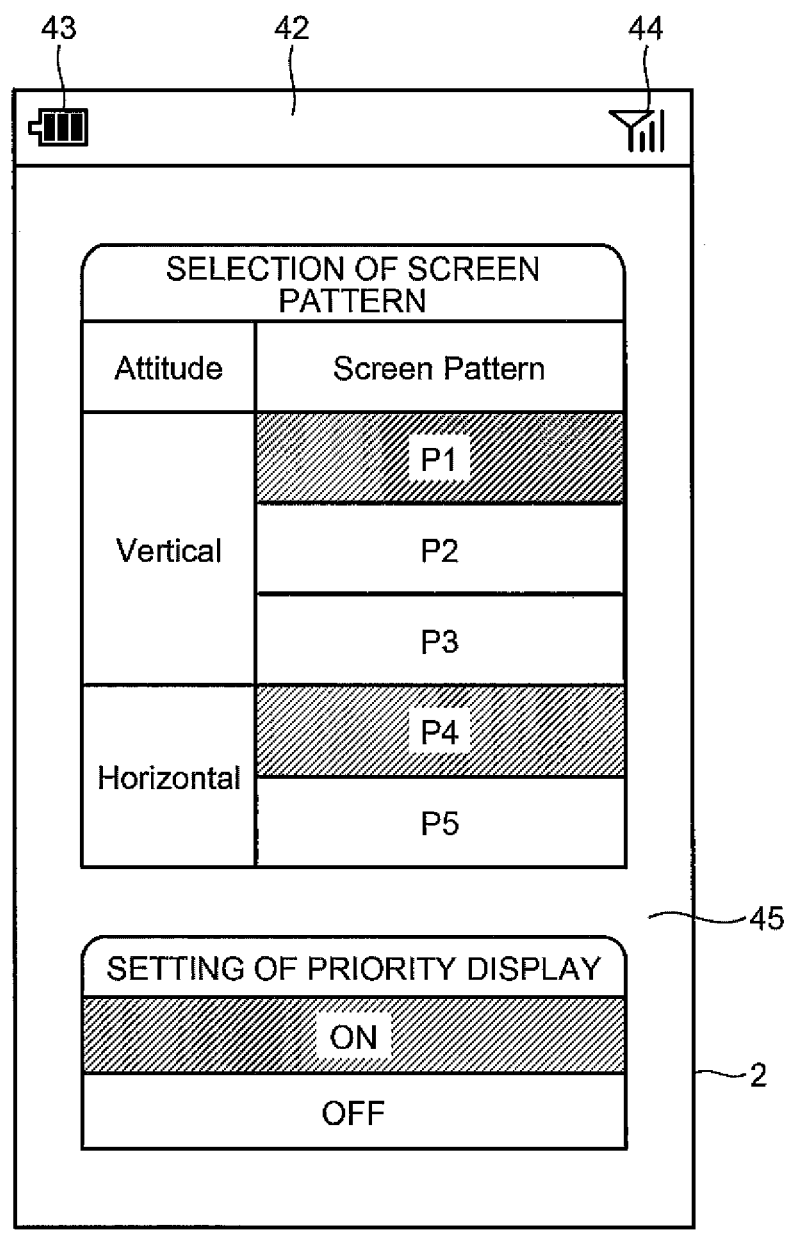
FIG. 20 is a diagram of an example of a user interface used to select a screen pattern and to set a priority display.

FIG. 20 is a diagram of an example of the user interface used to select a screen pattern and to set a priority display. In the screen pattern table 9T stored in the storage 9, a screen pattern is set, and whether or not to perform a priority display is also set through the user interface 45 illustrated in FIG. 20. As illustrated in FIG. 20, for example, when the attitude of the smartphone 1 is "vertical", the user can select any one of "P1", "P2", and "P3" as a screen pattern through the user interface 45. On the other hand, when the attitude of the smartphone 1 is "horizontal", the user can select either one of "P4" and "P5". Furthermore, the user can set "ON" when the priority display is performed and can set "OFF" when it is not performed. The priority display is a display in which applications are ranked from, for example, a most frequently used one (one with the largest number of executions) based on the respective actual usage of the applications and are arranged in corresponding positions provided in the screen pattern.

FIG. 21 to FIG. 24 are diagrams of examples of the screen pattern according to Embodiment 2. The example illustrated in FIG. 21, which corresponds to an example illustrated in FIG. 8, is one of examples in which "P2" as one of the screen patterns used when the smartphone 1 is in the vertical attitude is displayed over the touch screen display 2. In an example illustrated in FIG. 21, numbers from (1) to (15) are assigned to the positions 53 where icons 50 are arranged, in addition to the example illustrated in FIG. 8. This means that an icon corresponding to an application that is most frequently used (has the largest number of executions) is arranged in the position 53 to which the number (1) is assigned, for example. Similarly to FIG. 21, the numbers are assigned to the positions 53 in FIG. 22 to FIG. 24.

Figure 22:
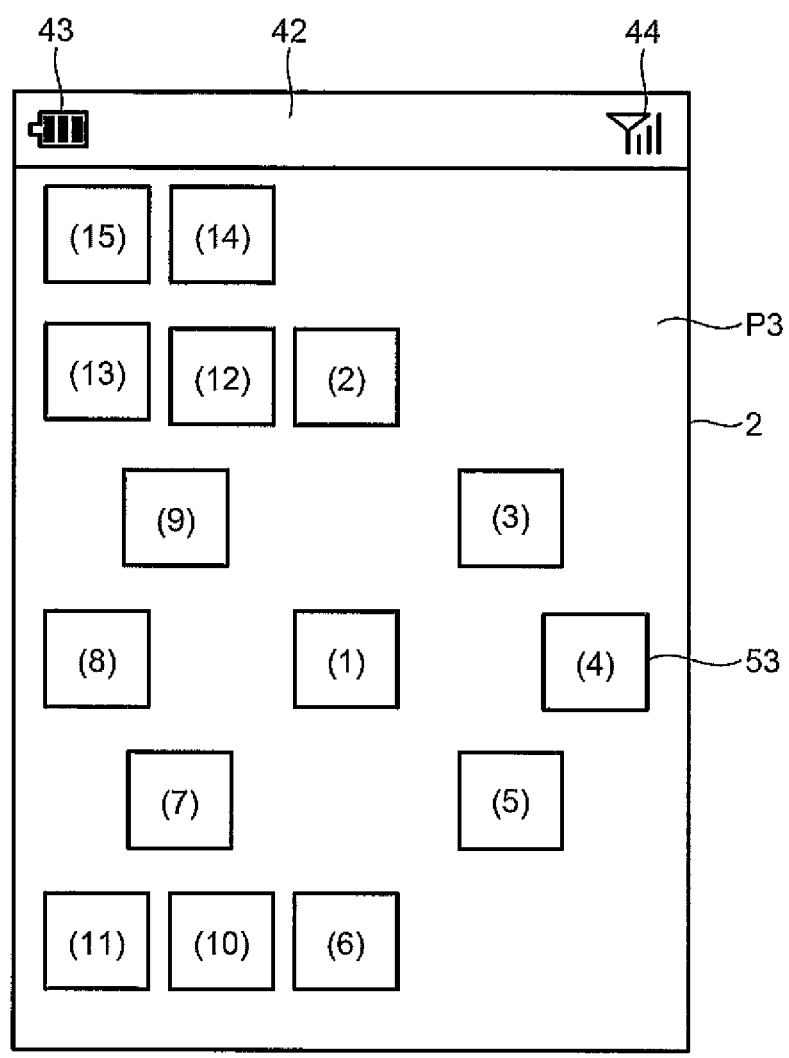
FIG. 22 is a diagram of an example of the screen pattern according to Embodiment 2.
Figure 23:
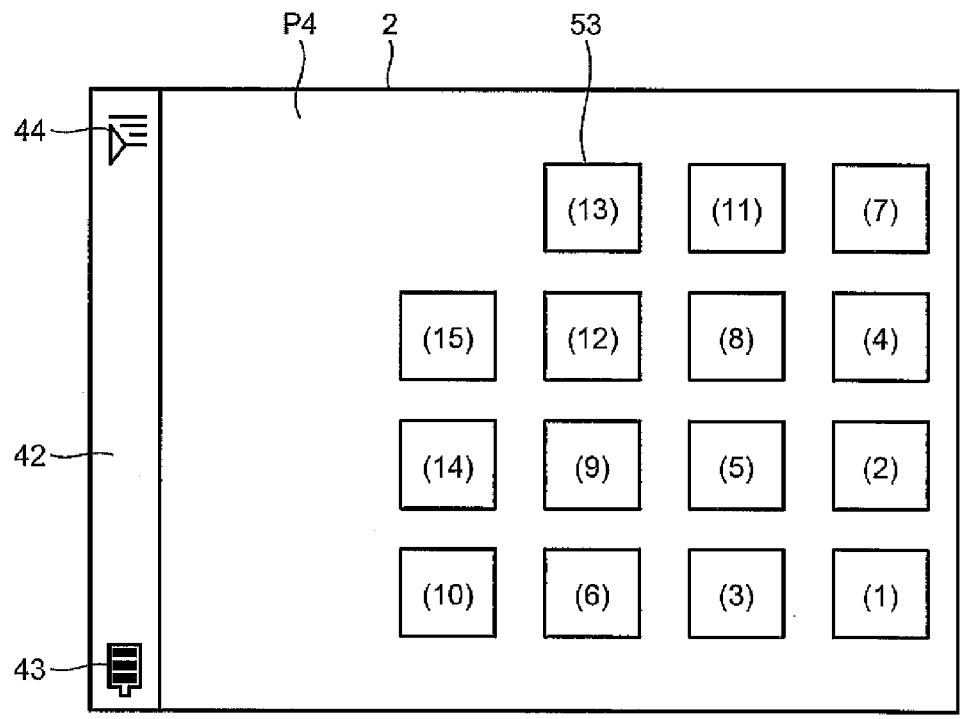
FIG. 23 is a diagram of an example of the screen pattern according to Embodiment 2.
Figure 24:
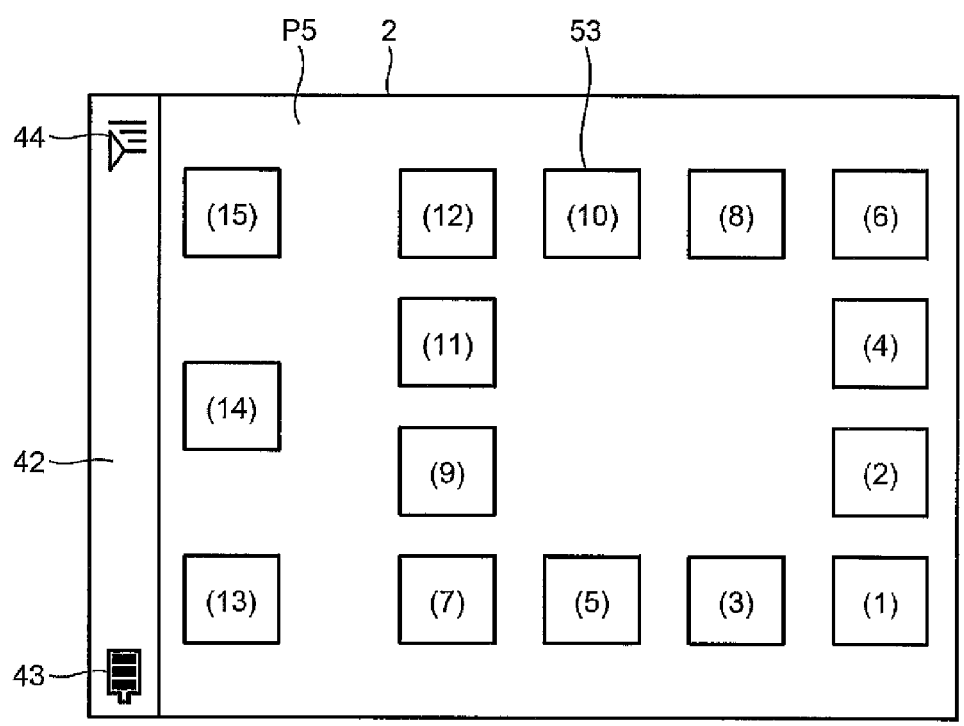
FIG. 24 is a diagram of an example of the screen pattern according to Embodiment 2.

The example illustrated in FIG. 22, which corresponds to an example illustrated in FIG. 9, is one of examples in which "P3" as one of the screen patterns used when the smartphone 1 is in the vertical attitude is displayed over the touch screen display 2. The example illustrated in FIG. 23, which corresponds to the example illustrated in FIG. 10, is one of examples in which "P4" as one of the screen patterns used when the smartphone 1 is in the horizontal attitude is displayed over the touch screen display 2. The example illustrated in FIG. 24, which corresponds to the example illustrated in FIG. 11, is one of examples in which "P5" as one of the screen patterns used when the smartphone 1 is in the horizontal attitude is displayed over the touch screen display 2.

Figure 21:
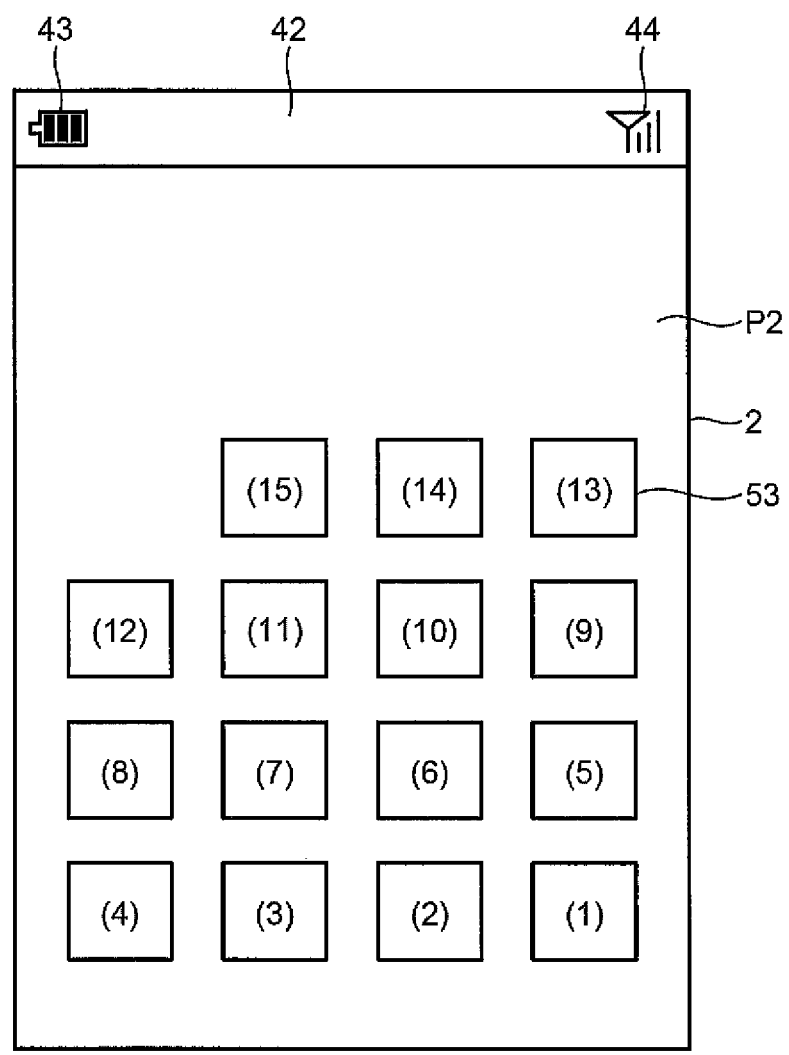
FIG. 21 is a diagram of an example of a screen pattern according to Embodiment 2.

In FIG. 21 to FIG. 24, a correspondence between positions 53 and numbers assigned to the positions 53 is an example, and therefore the correspondence is not limited to the examples illustrated in FIG. 21 to FIG. 24. For example, an example illustrated in FIG. 21 is based on consideration of the operability of the user who operates the touch screen display 2 by using mainly the thumb of his/her right hand, and an icon 50 corresponding to a more frequently used application is arranged close to the bottom-right of the touch screen display 2. In this way, a correspondence between positions 53 and numbers assigned to the positions 53 may be changed as appropriate according to a type of a finger used when the user operates the touch screen display 2 or a dominant arm of the user.

The function provided by the control program 9A stored in the storage 9 includes a function of determining arrangement positions based on the actual usage of applications when icons 50 are arranged on the list screen 40 in the first pattern (pattern used in the vertical attitude) or in the second pattern (pattern used in the horizontal attitude).

The controller 10 executes the control program 9A to thereby determine arrangement positions based on the actual usage of applications when icons 50 are arranged on the list screen 40 in the first pattern (pattern used in the vertical attitude) or in the second pattern (pattern used in the horizontal attitude). For example, first of all, the controller 10 ranks the applications from a first place to a 15th place in order of the most frequently used one (one with the largest number of executions) based on the actual usage of the applications stored in the storage 9. Subsequently, the controller 10 determines arrangement positions of icons 50 corresponding to the applications so that the respective orders of the applications coincide with the respective numbers assigned to the positions 53 in the screen pattern "P2". For example, the controller 10 determines an arrangement position of each of icons 50 so that an order of an application and a number assigned to a position 53 in the screen pattern "P2" coincide with each other, such as the first order and the number (1), the second order and the number (2), and the third order and the number (3).

Furthermore, when there are applications with the same numbers of executions as each other, the controller 10 ranks an application with the higher cumulative number of executions in a higher order than the others. Moreover, when there are applications with the same number of executions and the same cumulative number of executions, the controller 10 ranks either one of the applications in a higher order than the others according to, for example, an alphabetical order.

Figure 25:
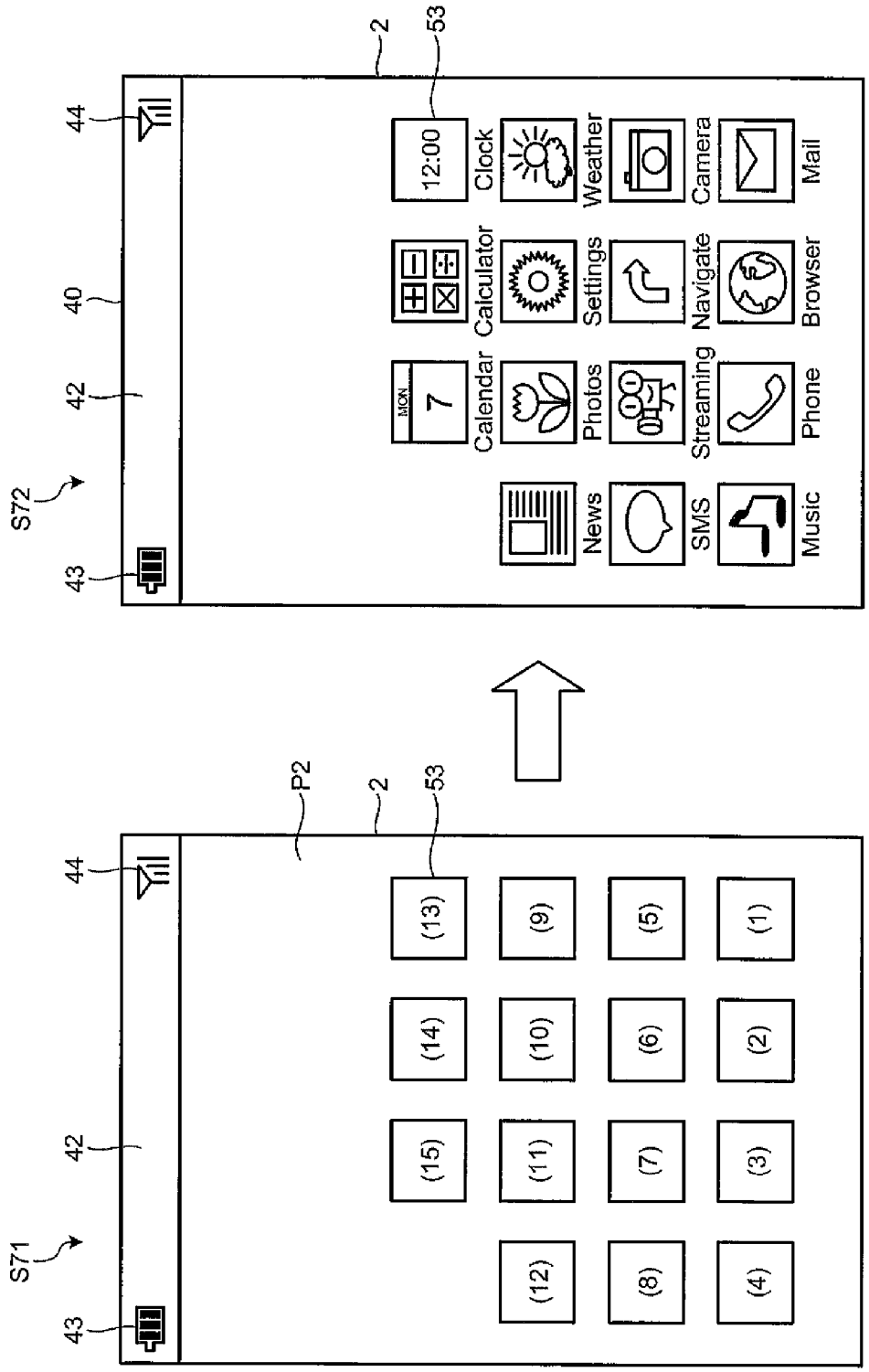
FIG. 25 is a diagram of an example of control based on a function provided by a control program according to Embodiment 2.
Figure 26:
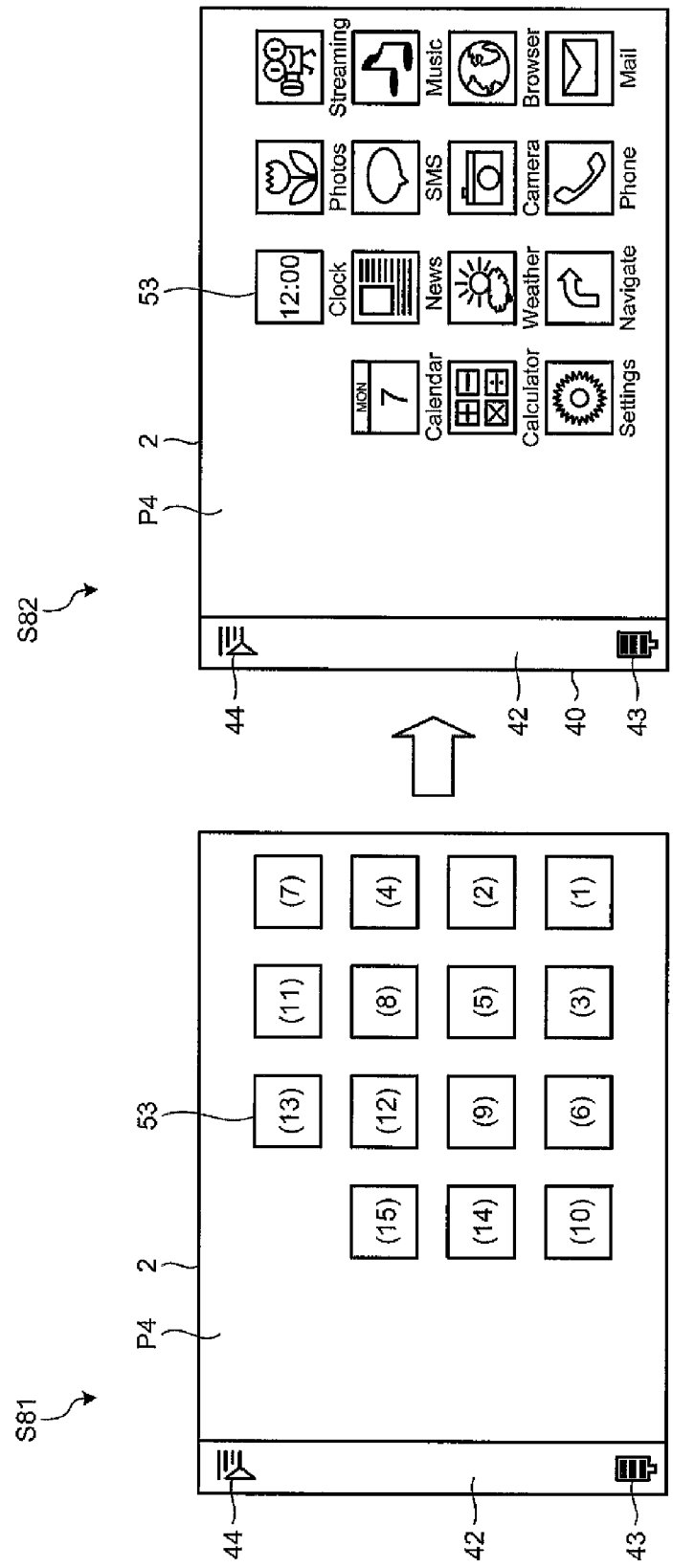
FIG. 26 is a diagram of an example of the control based on the function provided by the control program according to Embodiment 2.

FIG. 25 and FIG. 26 are diagrams of examples of the control based on the function provided by the control program 9A according to Embodiment 2. The example of the control illustrated in FIG. 25 is one of examples when a screen pattern used to display the list screen 40 is determined to "P2". The example of the control illustrated in FIG. 26 is one of example when a screen pattern used to display the list screen 40 is determined to "P4".

As illustrated in FIG. 25, the smartphone 1 determines the screen pattern used to display the list screen 40 to "P2" (see FIG. 21) according to, for example, the vertical attitude as the current attitude (Step S71). Subsequently, the smartphone 1 determines arrangement positions used when icons 50 are arranged according to the screen pattern "P2" based on the actual usage of the applications (Step S72). For example, the smartphone 1 ranks the applications from the first place to the 15th place based on the actual usage of the applications stored in the storage 9. Subsequently, for example, when the order of the mail application 9C is the first, the smartphone 1 determines a position assigned with the number "1", among the positions 53 in the screen pattern "P2", as an arrangement position of an icon 50 corresponding to the mail application 9C. Likewise, the smartphone 1 also determines arrangement positions of icons 50 corresponding to the other applications such as the browser application 9D and the phone call application 9B. Then, as illustrated at Step S72, the smartphone 1 displays the list screen 40 where icons 50 corresponding to the applications are arranged according to the screen pattern "P2" on the touch screen display 2.

As illustrated in FIG. 26, the smartphone 1 determines a screen pattern used to display the list screen 40 to "P4" (see FIG. 23) according to, for example, the horizontal attitude being the current attitude (Step S81). Subsequently, the smartphone 1 determines arrangement positions used when icons 50 are arranged according to the screen pattern "P4" based on the actual usage of the applications (Step S82). For example, the smartphone 1 ranks the applications from the first place to the 15th place based on the actual usage of the applications stored in the storage 9. Subsequently, for example, when the order of the mail application 9C is the first, the smartphone 1 determines a position assigned with the number "1", among the positions 53 in the screen pattern "P4", as an arrangement position of an icon 50 corresponding to the mail application 9C. Likewise, the smartphone 1 also determines arrangement positions of icons 50 corresponding to the other applications such as the browser application 9D and the phone call application 9B. Then, as illustrated at Step S82, the smartphone 1 displays the list screen 40 where icons 50 corresponding to the applications are arranged according to the screen pattern "P4" on the touch screen display 2.

Figure 27:
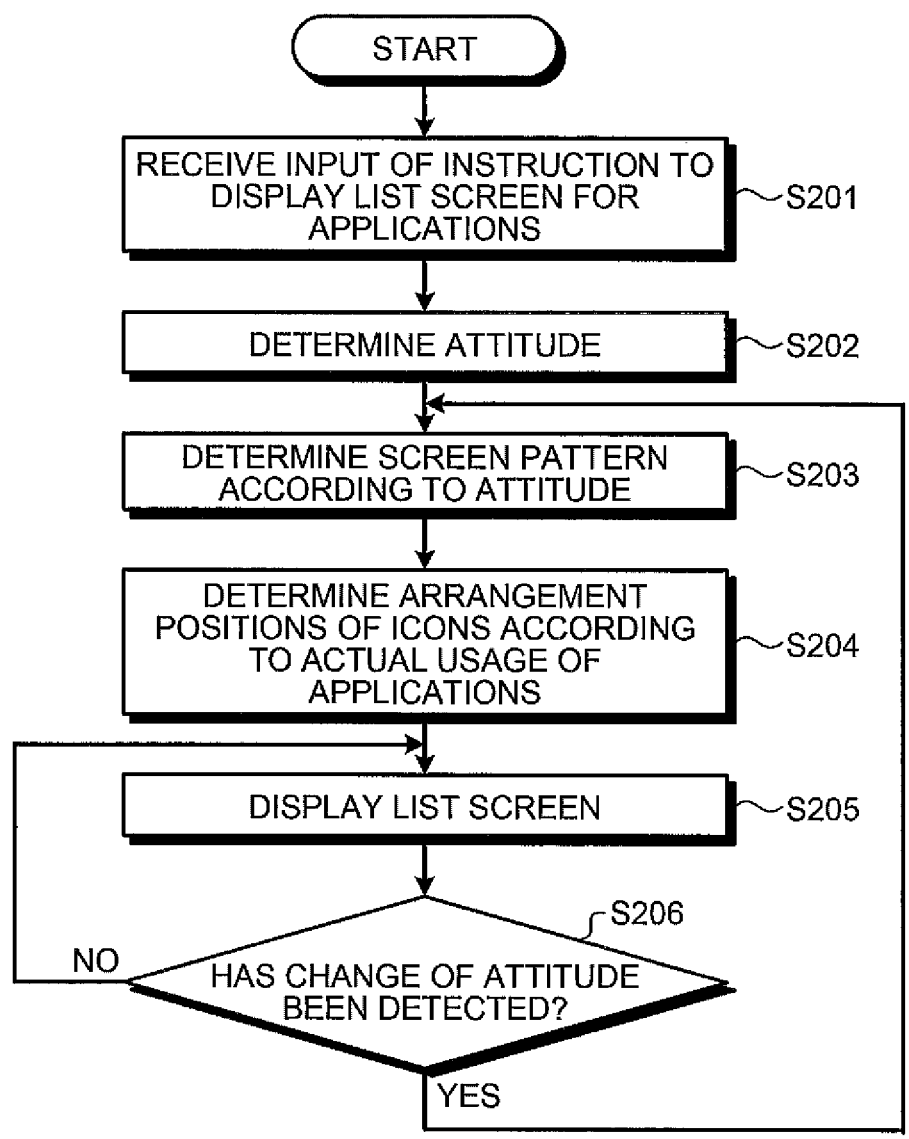
FIG. 27 is a diagram of an example of a processing procedure of the control based on the function provided by the control program according to Embodiment 2.

FIG. 27 is a diagram of an example of a processing procedure of the control based on the function provided by the control program 9A according to Embodiment 2. The processing procedure illustrated in FIG. 27 is implemented by the controller 10 executing the control program 9A. The processing procedure illustrated in FIG. 27 is repeatedly executed while the smartphone 1 operates, for example.

As illustrated in FIG. 27, when receiving an input of an instruction (operation performed on the operating portion 62) to display the list screen 40 for applications at Step S201, then at Step S202, the controller 10 determines an attitude based on the detection result of the attitude detecting unit 15.

After the determination of the attitude, at Step S203, the controller 10 determines a screen pattern according to the attitude based on the screen pattern table 9T stored in the storage 9. Subsequently, at Step S204, the controller 10 determines arrangement positions of icons 50 based on the actual usage of the applications stored in the storage 9. After the determination of the arrangement positions of icons 50, at Step S205, the controller 10 displays the list screen 40 where icons 50 are arranged according to the screen pattern determined at Step S203 on the display 2A.

Subsequently, at Step S206, the controller 10 determines whether the change of the attitude has been detected by the attitude detecting unit 15. When the change of the attitude has been detected as the result of determination (Yes at Step S206), the controller 10 returns to Step S203 and again determines a screen pattern according to the attitude. Meanwhile, when the change of the attitude has not been detected as the result of determination (No at Step S206), the controller 10 returns to Step S205.

As explained above, in Embodiment 2, the smartphone 1 determines the arrangement positions of icons 50 according to the actual usage of the applications. Therefore, according to Embodiment 2, the convenience can be further improved according to use conditions by the user.

Embodiment 2 has explained an example of using the number of executions of applications as the actual usage; however, the embodiment is not limited thereto. Therefore, the use time of applications may be used.

Third Embodiment

Embodiment 2 has explained an example of determining the arrangement positions of icons 50 according to the actual usage of the applications. In the following, Embodiment 3 will explain an example of further storing the attitude taken when an application is executed as actual usage and changing a display style of icons 50 based on the actual usage of the applications.

FIG. 28 is a diagram of an example of actual usage of applications stored in the storage 9 according to Embodiment 3. The actual usage of the applications are written to, for example, the setting data 9Z of the storage 9. As illustrated in FIG. 28, the smartphone 1 stores information for the attitude in execution of an application, as the actual usage for each application, in addition to the number of executions and the cumulative number of executions of the application. For example, the information for the attitude in the execution may be the number of times of activating an application counted for each attitude, or may be the number of times each in which a corresponding attitude is maintained during a period from activating the application to terminating the application, or may be set not to include change of the attitude in execution. In an example illustrated in FIG. 28, the change of the attitude in execution is not included. As the information for the attitude in the execution, information detected by the attitude detecting unit 15 is used.

The function provided by the control program 9A stored in the storage 9 includes a function of changing a display style of icons 50 corresponding to applications frequently executed in the second attitude (horizontal attitude) (or applications less frequently executed in the first attitude) when the list screen 40 where icons 50 are arranged in the first pattern (pattern used in the vertical attitude) is displayed. Furthermore, the function provided by the control program 9A includes a function of changing a display style of icons 50 corresponding to applications frequently executed in the first attitude (vertical attitude) (or applications less frequently executed in the second attitude) when the list screen 40 where icons 50 are arranged in the second pattern (pattern used in the horizontal attitude) is displayed.

By executing the control program 9A, the controller 10 changes the display style of icons 50 corresponding to applications frequently executed in the second attitude (horizontal attitude) (or applications less frequently executed in the first attitude) when the list screen 40 where icons 50 are arranged in the first pattern (pattern used in the vertical attitude) is displayed. Furthermore, the controller 10 changes the display style of icons 50 corresponding to applications frequently executed in the first attitude (vertical attitude) (or applications less frequently executed in the second attitude) when the list screen 40 where icons 50 are arranged in the second pattern (pattern used in the horizontal attitude) is displayed.

Figure 29:
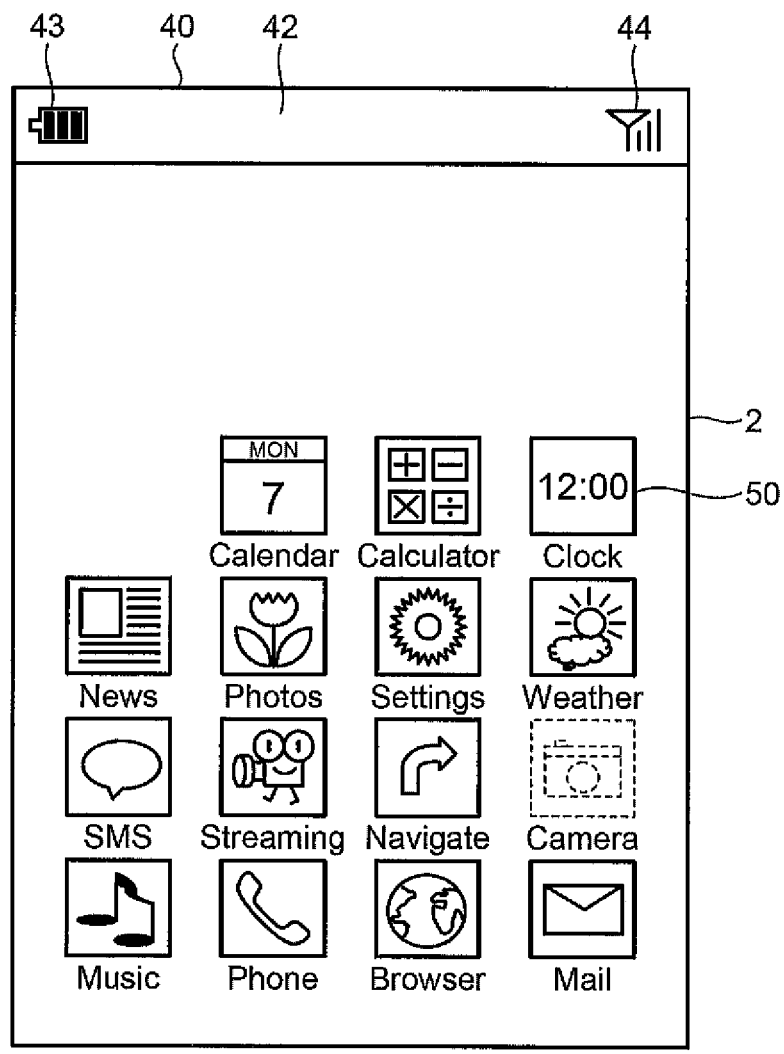
FIG. 29 is a diagram of a display example of a list screen according to Embodiment 3.
Figure 30:
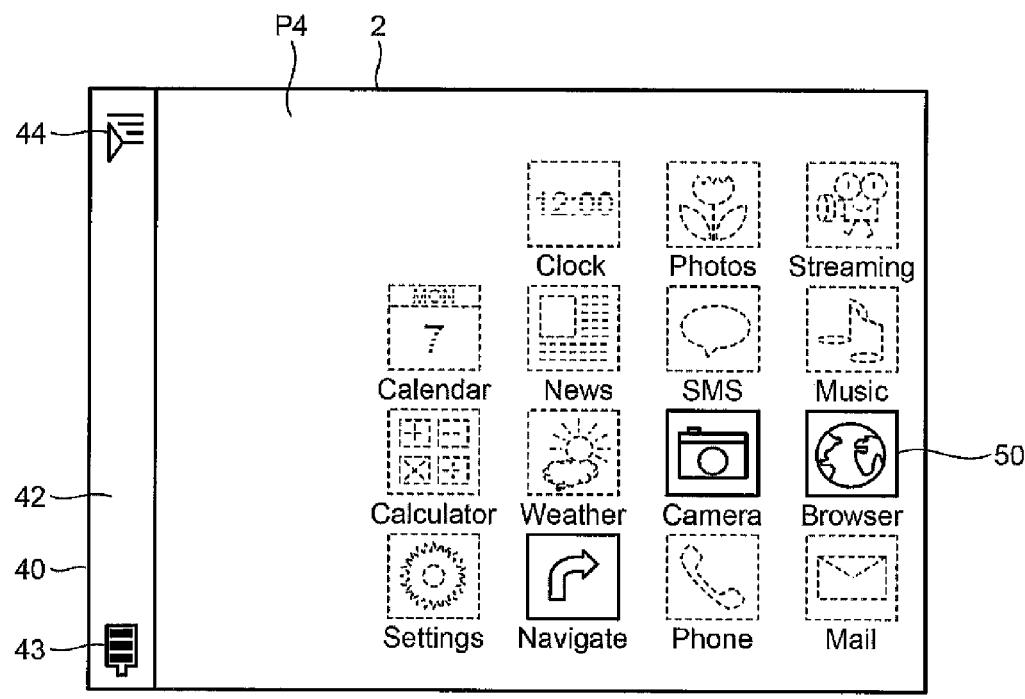
FIG. 30 is a diagram of a display example of the list screen according to Embodiment 3.

FIG. 29 and FIG. 30 are diagrams of display examples of a list screen 40 according to Embodiment 3. An example illustrated in FIG. 29 is a display example of the list screen when the smartphone 1 is in the vertical attitude, and an example illustrated in FIG. 30 is a display example of the list screen when the smartphone 1 is in the horizontal attitude.

As illustrated in FIG. 29, when it is in the vertical attitude, the smartphone 1 changes the display style of an icon 50 corresponding to the camera application 9I without execution results in the vertical attitude, based on the actual usage stored in the storage 9.

As illustrated in FIG. 30, when it is in the horizontal attitude, the smartphone 1 changes the display style of icons 50 corresponding to the phone call application 9B, the mail application 9C, the music player application 9F, the calendar application 9G, and the like without execution results in the horizontal attitude, based on the actual usage stored in the storage 9.

The method of changing the display style is not limited to the examples illustrated in FIG. 29 and FIG. 30. Therefore, it is possible to use any one of methods of vibrating an icon 50, changing brightness (pixel value) or transparency of an icon 50, surrounding an icon 50 with a frame, changing a color of a frame surrounding an icon 50, adding a symbol to an icon 50, and the like.

Figure 31:
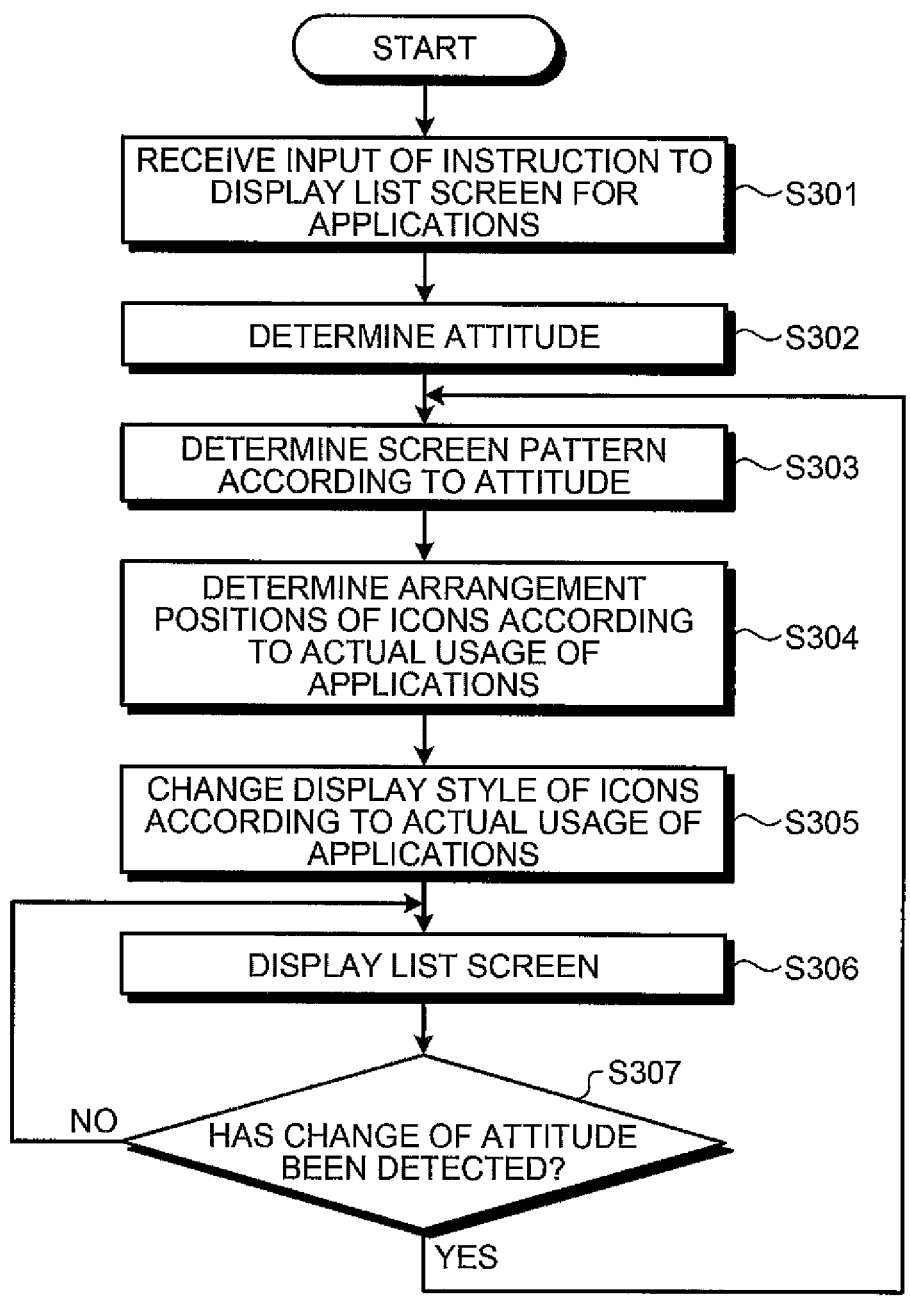
FIG. 31 is a diagram of an example of a processing procedure of control based on a function provided by a control program according to Embodiment 3.

FIG. 31 is a diagram of an example of a processing procedure of control based on a function provided by the control program 9A according to Embodiment 3. The processing procedure illustrated in FIG. 31 is implemented by the controller 10 executing the control program 9A. The processing procedure illustrated in FIG. 31 is repeatedly executed while the smartphone 1 operates, for example.

As illustrated in FIG. 31, when receiving an input of an instruction (operation performed on the operating portion 62) to display the list screen 40 for applications at Step S301, then at Step S302, the controller 10 determines an attitude based on the detection result of the attitude detecting unit 15.

After the determination of the attitude, at Step S303, the controller 10 determines a screen pattern according to the attitude based on the screen pattern table 9T stored in the storage 9. Subsequently, at Step S304, the controller 10 determines arrangement positions of icons 50 based on the actual usage of the applications stored in the storage 9. After the determination of the arrangement positions of icons 50, at Step S305, the controller 10 changes the display style of icons 50 based on the actual usage of the applications stored in the storage 9. After the change of the display style of an icon 50, at Step S306, the controller 10 displays the list screen 40 where icons 50 are arranged according to the screen pattern determined at Step S303 on the touch screen display 2 (display 2A).

Subsequently, at Step S307, the controller 10 determines whether the change of the attitude has been detected by the attitude detecting unit 15. When the change of the attitude has been detected as the result of determination (Yes at Step S307), the controller 10 returns to Step S303 and again determines a screen pattern according to the attitude. Meanwhile, when the change of the attitude has not been detected as the result of determination (No at Step S307), the controller 10 returns to Step S306.

As explained above, in Embodiment 3, the smartphone 1 further records the attitude upon execution of an application as its actual usage, and changes the display style of icons 50 based on the actual usage of the application. Therefore, according to Embodiment 3, the convenience can be further improved according to the use conditions by the user.

Fourth Embodiment

Embodiment 3 has explained an example of changing the display style of an icon 50 based on the actual usage of the application; however, an icon 50 may be displayed or hidden based on the actual usage.

The function provided by the control program 9A stored in the storage 9 includes a function of displaying icons 50 corresponding to applications frequently executed in the first attitude (vertical attitude) (or hiding icons 50 corresponding to applications less frequently executed in the first attitude) when the list screen 40 where icons 50 are arranged in the first pattern (pattern used in the vertical attitude) is displayed. Furthermore, the function provided by the control program 9A includes a function of displaying icons 50 corresponding to applications frequently executed in the second attitude (horizontal attitude) (or hiding icons 50 corresponding to applications less frequently executed in the second attitude) when the list screen 40 where icons 50 are arranged in the second pattern (pattern used in the horizontal attitude) is displayed.

By executing the control program 9A, the controller 10 displays icons 50 corresponding to applications frequently executed in the first attitude (vertical attitude) (or hides icons 50 corresponding to applications less frequently executed in the first attitude) when the list screen 40 where icons 50 are arranged in the first pattern (pattern used in the vertical attitude) is displayed. Furthermore, the controller 10 displays icons 50 corresponding to applications frequently executed in the second attitude (horizontal attitude) (or hides icons 50 corresponding to applications less frequently executed in the second attitude) when the list screen 40 where icons 50 are arranged in the second pattern (pattern used in the horizontal attitude) is displayed.

Figure 32:
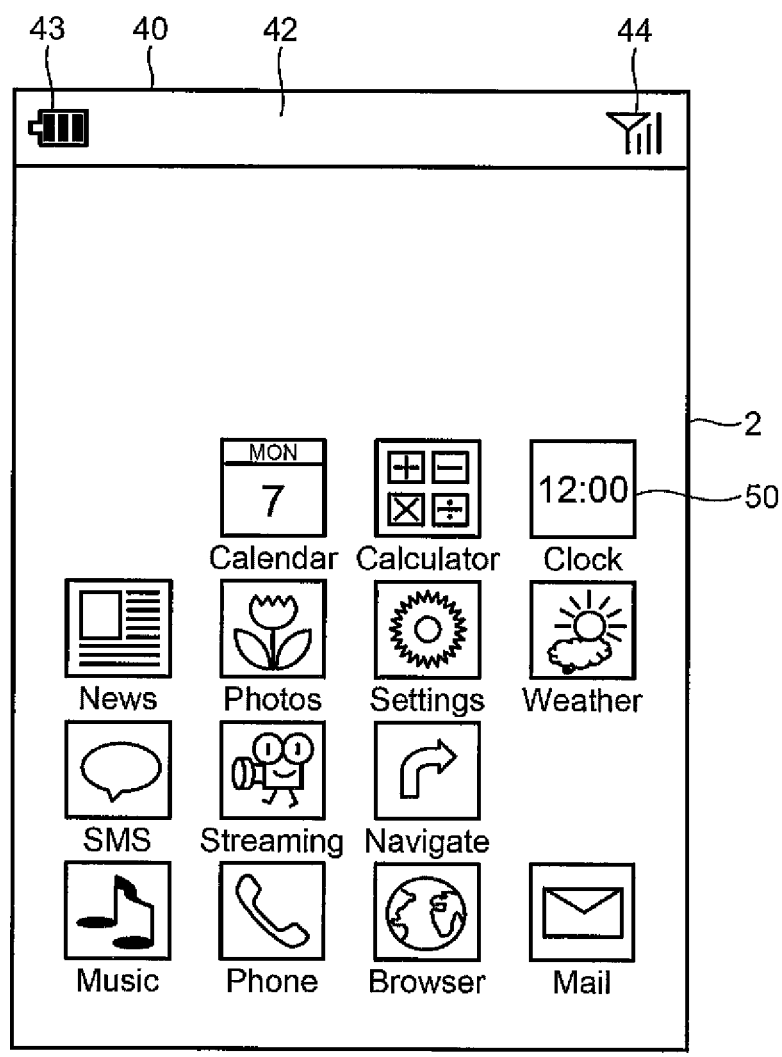
FIG. 32 is a diagram of a display example of a list screen according to Embodiment 4.
Figure 33:
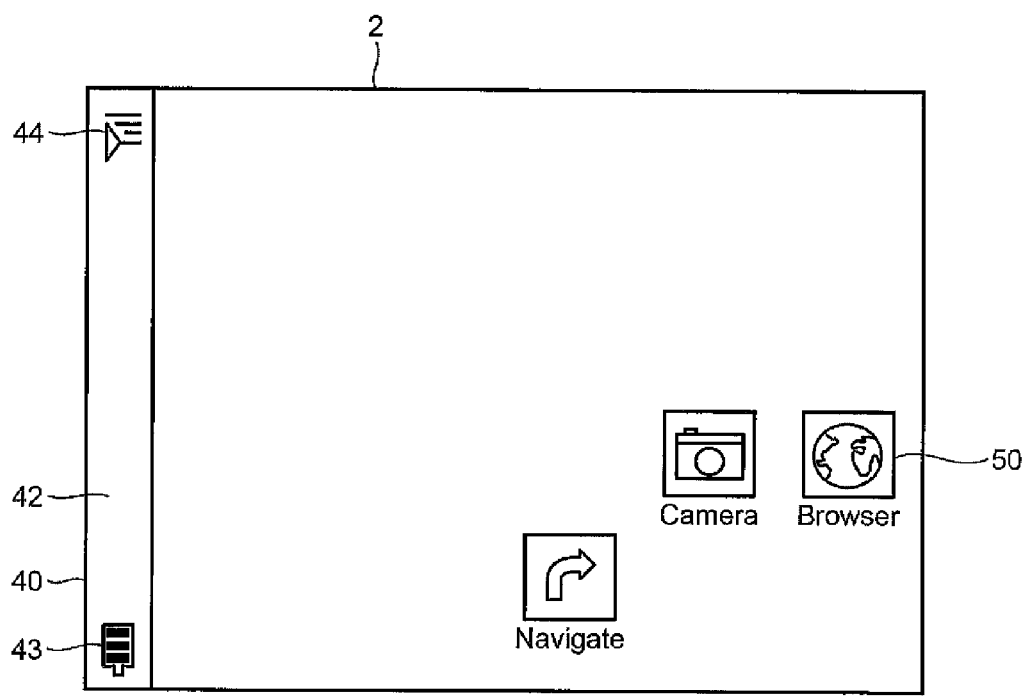
FIG. 33 is a diagram of a display example of the list screen according to Embodiment 4.

FIG. 32 and FIG. 33 are diagrams of display examples of a list screen 40 according to Embodiment 4. An example illustrated in FIG. 32 is a display example of the list screen when the smartphone 1 is in the vertical attitude, and an example illustrated in FIG. 33 is a display example of the list screen when the smartphone 1 is in the horizontal attitude.

As illustrated in FIG. 32, when it is in the vertical attitude, the smartphone 1 displays icons 50 corresponding to applications with execution results in the vertical attitude based on the actual usage stored in the storage 9. On the other hand, the smartphone 1 does not display an icon 50 corresponding to the camera application 9I without execution results in the vertical attitude.

As illustrated in FIG. 33, when it is in the horizontal attitude, the smartphone 1 displays icons 50 corresponding to the browser application 9D, the navigate application 9E, and the camera application 9I with execution results in the horizontal attitude based on the actual usage stored in the storage 9. On the other hand, the smartphone 1 does not display icons 50 corresponding to the applications without execution results in the horizontal attitude.

Figure 34:
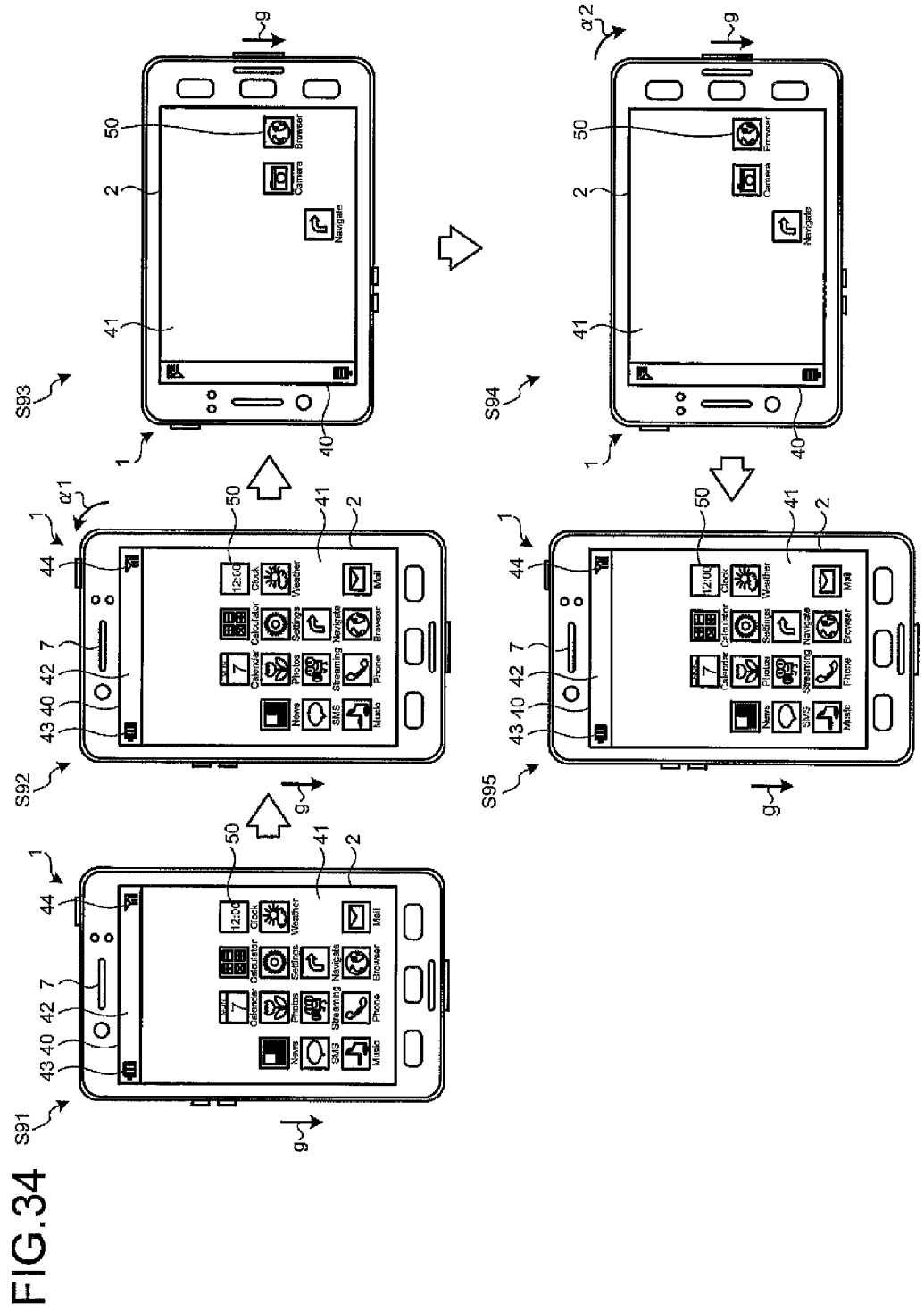
FIG. 34 is a diagram of an example of control based on a function provided by a control program according to Embodiment 4.

FIG. 34 is a diagram of an example of control based on the function provided by the control program 9A according to Embodiment 4. The example illustrated in FIG. 34 is one of examples of control in a case of changing the attitude of the smartphone 1 when the list screen 40 illustrated in FIG. 32 or FIG. 33 is displayed.

As illustrated in FIG. 34, the smartphone 1 displays the list screen 40 on the touch screen display 2 using the screen pattern according to the current attitude (Step S91). For example, the smartphone 1 determines a screen pattern used when the current attitude is the vertical attitude based on the screen pattern table 9T. Subsequently, the smartphone 1 ranks the applications from the most frequently used one (one with the largest number of executions) based on the actual usage of the applications. Subsequently, the smartphone 1 determines arrangement positions of icons 50 corresponding to the applications so that the respective orders of the applications and the respective numbers assigned to the positions 53 in the screen pattern (e.g., see FIG. 21) coincide with each other. The smartphone 1 then refers to the actual usage to display the list screen 40 (e.g., FIG. 32), in which icons 50 corresponding to the applications with execution results in the vertical attitude are arranged in the determined arrangement positions, on the touch screen display 2 (display 2A).

The user rotates the smartphone 1 in the direction of arrow α1 and changes the attitude of the smartphone 1 from the state of Step S92 to the state of Step S93. That is, the user changes the attitude of the smartphone 1 from the vertical attitude to the horizontal attitude (Step S92 to Step S93).

When detecting the change of the attitude, the smartphone 1 changes the orientation of the screen so that the orientation of the screen becomes an orientation in which the screen top-to-bottom direction of the list screen 40 displayed on the touch screen display 2 coincides with the top-to-bottom direction of the housing 20 (e.g., see FIG. 1) i.e. with the direction of the arrow g (direction of gravitational acceleration), based on the detection result of the attitude.

Furthermore, the smartphone 1 again determines a screen pattern according to the changed attitude and displays the list screen 40 on the touch screen display 2 using the determined screen pattern (Step S93). For example, the smartphone 1 determines a screen pattern (e.g., see FIG. 33) used when the current attitude is the horizontal attitude based on the screen pattern table 9T. Subsequently, the smartphone 1 ranks the applications from the most frequently used one (with the largest number of executions) based on the actual usage of the applications. Then, the smartphone 1 determines arrangement positions of icons 50 corresponding to the applications so that the respective orders of the applications and the respective numbers assigned to the positions 53 in the screen pattern (e.g., see FIG. 23) coincide with each other. Then, the smartphone 1 refers to the actual usage to display the list screen 40 (e.g., FIG. 33), in which only the icons 50 corresponding to the applications with execution results in the horizontal attitude are arranged in the determined arrangement positions, on the touch screen display 2 (display 2A).

The user rotates the smartphone 1 in the direction of arrow α2 and changes the attitude of the smartphone 1 from the state of Step S94 to the state of Step S95. That is, the user changes the attitude of the smartphone 1 from the horizontal attitude to the vertical attitude (Step S94 to Step S95).

When detecting the change of the attitude, the smartphone 1 changes the orientation of the screen so that the orientation of the screen becomes an orientation in which the screen top-to-bottom direction of the list screen 40 displayed on the touch screen display 2 coincides with the top-to-bottom direction of the housing 20 (e.g., see FIG. 1) i.e. with the direction of the arrow g (direction of gravitational acceleration), based on the detection result of the attitude.

Furthermore, the smartphone 1 again determines a screen pattern according to the changed attitude and displays the list screen 40 on the touch screen display 2 using the determined screen pattern (Step S95). In other words, when the attitude of the smartphone 1 is returned from the horizontal attitude to the vertical attitude, the smartphone 1 again uses the same screen pattern as that of Step S91 to display the list screen 40 on the touch screen display 2 (display 2A).

In the controls illustrated in FIG. 34, the smartphone 1 may rank applications with actual usage in the current attitude according to the actual usage and determine arrangement positions in the screen pattern.

As explained above, in Embodiment 4, the smartphone 1 further records the attitude upon execution of an application as its actual usage, and displays or hides an icon 50 based on the actual usage of the application. Therefore, according to Embodiment 4, the convenience can be further improved according to the use conditions by the user.

Even when the display style of an icon 50 is changed based on the actual usage of an application, the controls illustrated in FIG. 34 may be executed.

Other Embodiments

Although the art of appended claims has been described with respect to specific embodiments for a complete and clear disclosure, the appended claims are not to be thus limited but are to be construed as embodying all modifications and alternative constructions that may occur to one skilled in the art which fairly fall within the basic teaching herein set forth.

Embodiment 1 to Embodiment 4 have explained the smartphone as an example of the device with the touch screen; however, the device according to the appended claims is not limited to the smartphone. The device according to the appended claims may be any mobile electronic device other than the smartphone. Examples of the mobile electronic device include, but are not limited to, mobile phones, tablets, mobile personal computers, digital cameras, media players, electronic book readers, navigators, and gaming devices. Alternatively, the device according to the appended claims may be a stationary-type electronic device. Examples of the stationary-type electronic device include, but are not limited to, a desktop personal computer and a television receiver.

The invention claimed is:

1. An electronic device, comprising:
a display configured to display a plurality of icons each corresponding to an application;
a detecting unit configured to detect an attitude of the electronic device; and
a controller configured to
cause the display to display a first screen where the icons are arranged in a first pattern when a first attitude is detected by the detecting unit, and
cause the display to display a second screen where the icons are arranged in a second pattern when a second attitude is detected by the detecting unit.

2. The electronic device according to claim 1, wherein the controller is configured to determine arrangement positions used when the icons are arranged on the first screen in the first pattern or on the second screen in the second pattern, based on actual usage of the applications.

3. The electronic device according to claim 2, wherein the controller is configured to
change a display style of an icon corresponding to an application executed in the second attitude based on the actual usage when the first screen where the icons are arranged in the first pattern is displayed on the display, and
change a display style of an icon corresponding to an application executed in the first attitude based on the actual usage when the second screen where the icons are arranged in the second pattern is displayed on the display.

4. The electronic device according to claim 2, wherein the controller is configured to
display an icon corresponding to an application executed in the first attitude based on the actual usage when the first screen where the icons are arranged in the first pattern is displayed on the display, and
display an icon corresponding to an application executed in the second attitude based on the actual usage when the second screen where the icons are arranged in the second pattern is displayed on the display.

5. A control method executed by an electronic device including a display configured to display a plurality of icons each corresponding to an application, the method comprising:
detecting an attitude of the electronic device;
displaying a first screen where the icons are arranged in a first pattern on the display when a first attitude is detected; and displaying a second screen where the icons are arranged in a second pattern on the display when a second attitude is detected.

6. A non-transitory storage medium that stores a control program that causes, when executed by an electronic device including a display configured to display a plurality of icons each corresponding to an application, the electronic device to execute:
detecting an attitude of the electronic device; and
displaying a first screen where the icons are arranged in a first pattern on the display when a first attitude is detected; and displaying a second screen where the icons are arranged in a second pattern on the display when a second attitude is detected.

7. The electronic device according to claim 2, wherein the controller is configured to
change a display style of an icon corresponding to an application less frequently executed in the first attitude based on the actual usage when the first screen where the icons are arranged in the first pattern is displayed on the display, and
change a display style of an icon corresponding to an application less frequently executed in the second attitude based on the actual usage when the second screen where the icons are arranged in the second pattern is displayed on the display.

8. The electronic device according to claim 2, wherein the controller is configured to
hide an icon corresponding to an application less frequently executed in the first attitude based on the actual usage when the first screen where the icons are arranged in the first pattern is displayed on the display, and
hide an icon corresponding to an application less frequently executed in the second attitude based on the actual usage when the second screen where the icons are arranged in the second pattern is displayed on the display.

* * * * *